United States Patent
Nakagawa et al.

(10) Patent No.: US 6,738,092 B1
(45) Date of Patent: May 18, 2004

(54) CAMERA APPARATUS AND METHOD FOR ASSOCIATING DIGITAL PICTURE FILES WITH THUMBNAIL IMAGES

(75) Inventors: Yutaka Nakagawa, Kanagawa (JP); Katsuhiko Ueno, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/090,288

(22) Filed: Jun. 4, 1998

(30) Foreign Application Priority Data

Jun. 9, 1997 (JP) .......................................... P9-151303

(51) Int. Cl.[7] .......................... H04N 5/76; H04N 5/222; H04N 5/781; G09G 5/00
(52) U.S. Cl. .............................. 348/231.3; 348/333.05; 348/231.2; 348/333.11; 386/125; 345/838
(58) Field of Search .......................... 348/14, 13, 239, 348/333.05, 231.2, 231.3, 231.6, 333.11; 382/244; 386/70, 106, 125, 126; 345/838

(56) References Cited

U.S. PATENT DOCUMENTS

| | | | |
|---|---|---|---|
| 4,789,979 A | 12/1988 | Hiraoka et al. | |
| 4,827,347 A | 5/1989 | Bell | |
| 5,093,731 A | * 3/1992 | Watanabe et al. | 348/231.2 |
| 5,164,831 A | * 11/1992 | Kuchta et al. | 348/231.7 |
| 5,206,931 A | * 4/1993 | Kimura et al. | 345/838 |
| 5,440,401 A | 8/1995 | Parulski et al. | |
| 5,477,264 A | * 12/1995 | Sarbadhikari et al. | 348/231 |
| 5,528,293 A | * 6/1996 | Watanabe | 348/231 |
| 5,576,757 A | * 11/1996 | Roberts et al. | 348/207 |
| 5,581,311 A | * 12/1996 | Kuroiwa | 348/231 |
| 5,656,348 A | 8/1997 | Kudo et al. | |
| 5,689,303 A | * 11/1997 | Kuroiwa | 345/231.3 |
| 5,724,579 A | * 3/1998 | Suzuki | 358/403 |
| 5,793,517 A | 8/1998 | Aizawa et al. | 358/468 |
| 5,819,261 A | 10/1998 | Takahashi et al. | |
| 5,943,517 A | * 8/1999 | Sato | 396/429 |
| 5,987,176 A | 11/1999 | Imaizumi et al. | |
| 6,020,920 A | 2/2000 | Anderson | |

(List continued on next page.)

FOREIGN PATENT DOCUMENTS

| | | | | |
|---|---|---|---|---|
| EP | 0619673 A1 | * 10/1994 | | H04N/1/40 |
| EP | 0 755 162 A2 | 1/1997 | | |
| JP | 3-117181 | 5/1991 | | |
| JP | 6-284368 | 10/1994 | | |
| JP | 06303533 A | * 10/1994 | | H04N/5/335 |
| JP | 07274108 A | * 10/1995 | | H04N/5/907 |

OTHER PUBLICATIONS

Cohen, Harvey A.; "Access and Retrieval from Image Databases Using Image Thumbnails"; Aug. 1996; International Symposium of Signal Processing and its Applications; pp. 427–428.*

"Video CCD Based Portable Digital Still Camera", Chan et al., IEEE, Aug. 1995, pp. 455–459.*

"DCT–Based Still Image Compression ICS With Bit–Rate Control", Nakagawa et al., IEEE, Aug. 1992, pp. 711–717.*

*Primary Examiner*—Wendy R. Garber
*Assistant Examiner*—John M. Villecco
(74) *Attorney, Agent, or Firm*—Lerner, David, Littenberg, Krumholz & Mentlik, LLP

(57) ABSTRACT

A camera device by which a still picture photographed without data transfer to a personal computer can be viewed on the personal computer. The camera apparatus includes an optical system, an imaging device 21 for converting light signals of the object from the optical system into electrical signals, an A/D converter 22 for converting the electrical signals from the imaging device 21 into digital picture data, a data compression unit 28a for compressing the picture data from the A/D converter 22 in a pre-set style based on a software program, and a data conversion unit 28, 31, 32 for converting compressed data from the data compression unit 28a into data of a pre-set style that permits recording on a recording floppy disc.

29 Claims, 19 Drawing Sheets

U.S. PATENT DOCUMENTS

| | | | |
|---|---|---|---|
| 6,020,982 A | | 2/2000 | Yamauchi et al. ........... 358/444 |
| 6,065,015 A | | 5/2000 | Kazami |
| 6,101,292 A | * | 8/2000 | Udagawa et al. ............ 345/643 |
| 6,104,430 A | * | 8/2000 | Fukuoka ...................... 348/232 |
| 6,192,191 B1 | * | 2/2001 | Suga et al. .................. 348/220 |
| 6,288,743 B1 | * | 9/2001 | Lathrop ....................... 348/222 |
| 6,310,647 B1 | * | 10/2001 | Parulski et al. .............. 348/232 |
| 6,377,745 B2 | | 4/2002 | Akiba et al. |
| 6,404,981 B1 | | 6/2002 | Kumagai et al. |

* cited by examiner

| AREA 0 | 0000000 : 0ffffff | ENCLOSED ROM 64KB | 8000000 : 8ffffff | NOT USED |
|---|---|---|---|---|
| AREA 1 | 1000000 : 1ffffff | NOT USED | 9000000 : 9ffffff | DRAM 1MB |
| AREA 2 | 2000000 : 2ffffff | FDC RESISTER | a000000 : affffff | NOT USED |
| AREA 3 | 3000000 : 3ffffff | NOT USED | b000000 : bffffff | NOT USED |
| AREA 4 | 4000000 : 4ffffff | NOT USED | c000000 : cffffff | NOT USED |
| AREA 5 | 5000000 : 5ffffff | ENCLOSED PERIPHERAL MODULE | d000000 : dffffff | NOT USED |
| AREA 6 | 6000000 : 60fffff | NOT USED | e000000 : effffff | FLASH MEMORY 256KB |
| AREA 7 | 7000000 : 7ffffff | NOT USED | f000000 : ffffff | ENCLOSED RAM 4KB |

FIG.4

DISC HYSTERESIS

001.JPG
002.JPG
(003.JPG)← DELETED BEFORE RECORDING 010.JPG
004.JPG
005.JPG← THUMBNAIL PICTURE FILE 005.411 WAS NOT REORDED
006.JPG
007.JPG
008.JPG
009.JPG
010.JPG← RECORDED AFTER DELETING 003.JPG

FIG.12

THUMBNAIL MANAGEMENT TABLE

| FILE NOS. | MAIN PICTURE FILES | CORRESPONDING THUMBNAIL ADDRESSES |
|---|---|---|
| 1 | 001.JPG | h |
| 2 | 002.JPG | g |
| 3 | 004.JPG | e |
| 4 | 005.JPG | 0 |
| 5 | 006.JPG | d |
| 6 | 007.JPG | c |
| 7 | 008.JPG | b |
| 8 | 009.JPG | a |
| 9 | 010.JPG | f |

CAMERA APPARATUS AND METHOD FOR ASSOCIATING DIGITAL PICTURE FILES WITH THUMBNAIL IMAGES

BACKGROUND OF THE INVENTION

1. Field of the Invention

This invention relates to a camera device and, more particularly, to a camera device for digitizing a picture of an object for recording as still picture data.

2. Related Art

Recently, as personal computers are coming into widespread use, digital camera devices, configured for digitizing and recording pictures, are stirring up notice as picture recording devices. As the digital camera devices, there are known such devices in which a pre-set number of object are digitized and recorded in a pre-set recording medium such as a flash memory as still-picture data so that the still pictures can be subsequently outputted to a monitor of the personal computer. The digital camera device usually has the function as a picture reproducing device of displaying a picture recorded on a pre-set recording medium from a picture display unit, such as a LCD panel, provided on the back side of the device. In addition, the digital camera device occasionally has the function of editing picture data such as erasing a recorded picture corresponding to an unneeded picture or an unsatisfactory picture.

In a conventional digital camera device, a flash memory enclosed in a main body portion or a telescopically movable card-type flash memory is used as a recording medium for picture data.

However, in the conventional digital camera device, since these memories are expensive in terms of costs per photographed picture and hence is not suitable as storage medium, it is necessary to transfer the photographed still picture data to a hard disc or a floppy disc in the personal computer for copying after photographing, this data transfer representing a time-and labor-consuming operation. In the conventional digital camera device, these memories are costly such that the user cannot own a number of such memories, so that the number of pictures that can be photographed cannot be increased as desired, while the chance of photographing outdoors is restricted since the user cannot carry the personal computers outdoors.

SUMMARY OF THE INVENTION

It is therefore an object of the present invention to provide a camera device whereby a still picture photographed without data transfer to a personal computer can be viewed on the personal computer.

The present invention provides a camera apparatus includes an optical system, an imaging device for converting light signals of the object from the optical system into electrical signals, an A/D converter for converting the electrical signals from the imaging device into digital picture data, data compression means for compressing the picture data from the A/D converter in a pre-set style based on a software program, and data conversion means for converting compressed data from the data compression means into data of a pre-set style that permits recording on a recording floppy disc.

With the present camera apparatus, the light signals of the object from the optical system are converted by the imaging device, A/D converter, data compression means and data convertion means into pre-set data that permits recording on a floppy disc.

Since the light signals of the object from the optical system are converted by the imaging device, A/D converter, data compression means and data conversion means into pre-set data and subsequently recorded on the floppy disc, the photographed still picture can be easily seen on a personal computer on loading the floppy disc carrying recorded still picture of the object on the floppy disc drive of the personal computer. This eliminates the necessity of transferring the photographed still picture data to a hard disc or a floppy disc of the personal computer after photographing to dispense with the time-consuming data transfer operation.

BRIEF DESCRIPTION OF THE DRAWINGS

FIG. 4 represents the address space of a micro-computer.

FIG. 12 illustrates the hysteresis for the recording states on the magnetic disc.

FIG. 13 illustrates a thumbnail management table.

DESCRIPTION OF PREFERRED EMBODIMENTS

Figure 1:
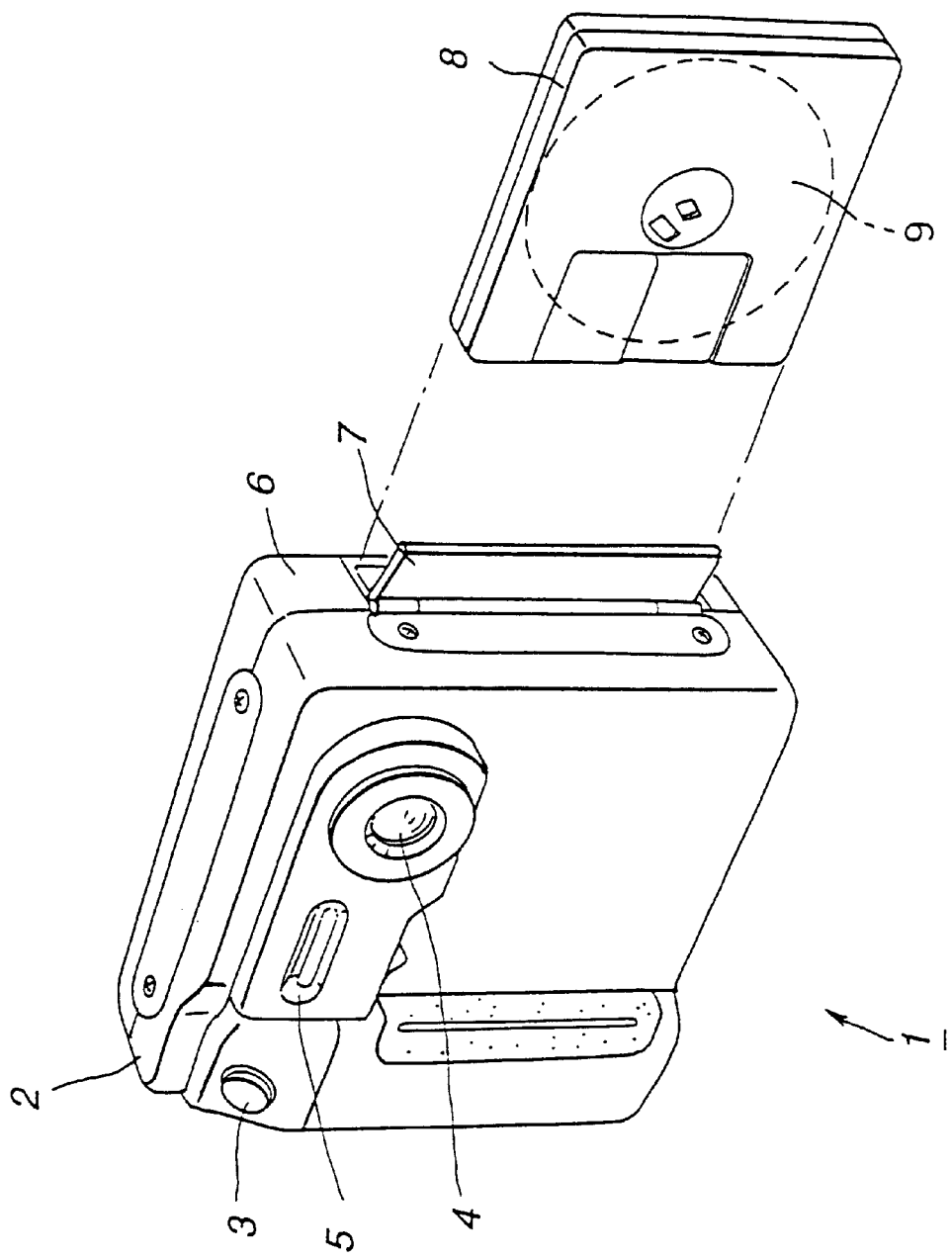
FIG. 1 is a perspective view from the front side of a digital camera device embodying the present invention.

Referring to the drawings, preferred embodiments of the present invention will be explained in detail. A digital camera device 1, embodying the present invention, is of a portable size and a substantially parallelepipedic shape, as shown in FIG. 1 showing the appearance of the device from the front side. In the present digital camera device 1, a shutter button 3, an objective lens 4 and a flash device 5 are mounted on an upper portion of a casing 2. The shutter button 3 can be pressed with an index finger of the user's right hand.

Figure 2:
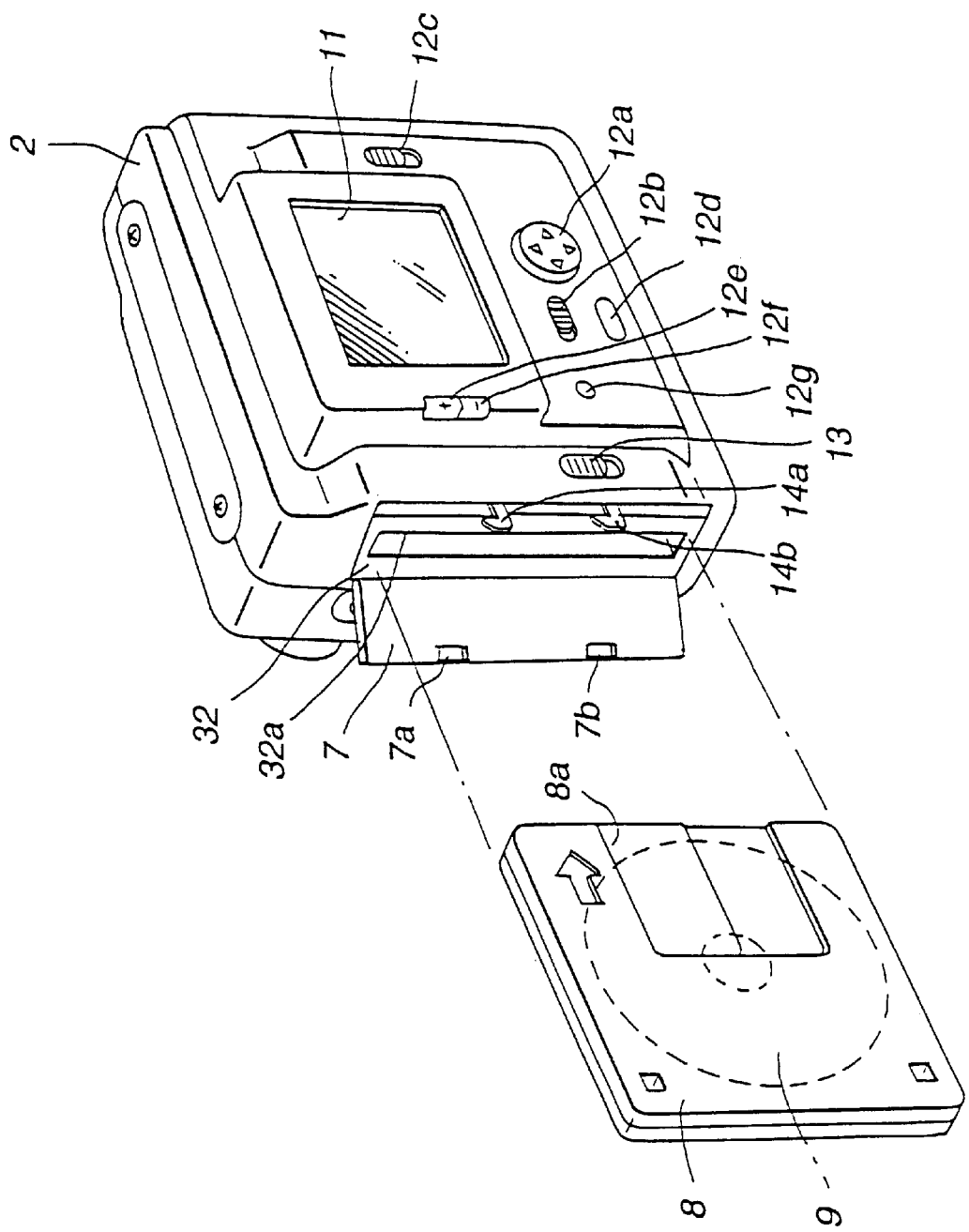
FIG. 2 is a perspective view of the digital camera device from the backside.

On a lateral surface 6 of the casing 2 of the digital camera device 1 is mounted an opening/closing lid 7. From the lateral surface 6, a floppy disc cartridge 8 holding a floppy magnetic disc 9 of the size of 3.5 inch can be loaded into the inside of the casing 2. This floppy magnetic disc 9 is referred to herein simply as a magnetic disc 9. Specifically, as shown in FIG. 2 showing the appearance from the back side of the digital camera device 1, there is arranged in the inside of the casing 2 a floppy disc drive 32 which will be explained subsequently in detail. The floppy disc cartridge 8 is inserted via a cartridge inserting opening 32a of the floppy disc drive 32 from the side of a shutter 8a.

On the back side of the casing 2 of the digital camera device 1 is mounted a liquid crystal display panel (LCD panel) 11 on which an object is displayed during photographing. If, in the digital camera device 1, the object is photographed by pressing the shutter button 3, there are recorded on a magnetic disc 9 in the floppy disc cartridge 8 loaded in the floppy disc drive 32 picture data of the object (main picture data) and thumbnail picture data operating as an index for the main picture data, in the form of files having extensions [.JPG] and [.JPG], respectively.

During reproduction of the main picture data after photographing the object, a thumbnail picture for thumbnail picture data recorded on the magnetic disc 9 is displayed for a pre-set number of pictures, such as six pictures, on the LCD display 11. If a particular one of the thumbnail pictures is designated, the main picture data corresponding to the thumbnail picture are read out from the magnetic disc 9 so as to be displayed on the LCD panel 11.

The digital camera device 1 can erase unneeded main picture data and the thumbnail picture data recorded on the magnetic disc 9 or change the arraying manner of the thumbnail pictures displayed on the LCD panel 11, by way of a variety of editing operations.

That is, in the present digital camera device 1, a variety of actuating buttons/switches 12a, 12b, 12c, 12d, 12e, 12f and 12g are arranged around the LCD panel 11. By actuating these operating buttons, zooming during photographing, designation of particular thumbnail pictures during reproduction or data erasure can be executed by way of editing operations.

The opening/closure of the opening/closing lid 7 can be achieved by vertically moving an opening/closure actuator 13 for cancelling or holding the engaged state of engagement pawls 14a, 14b interlocked with the opening/closure actuator 13 with engagement portions 7a, 7b of the opening/closing lid 7.

Figure 3:
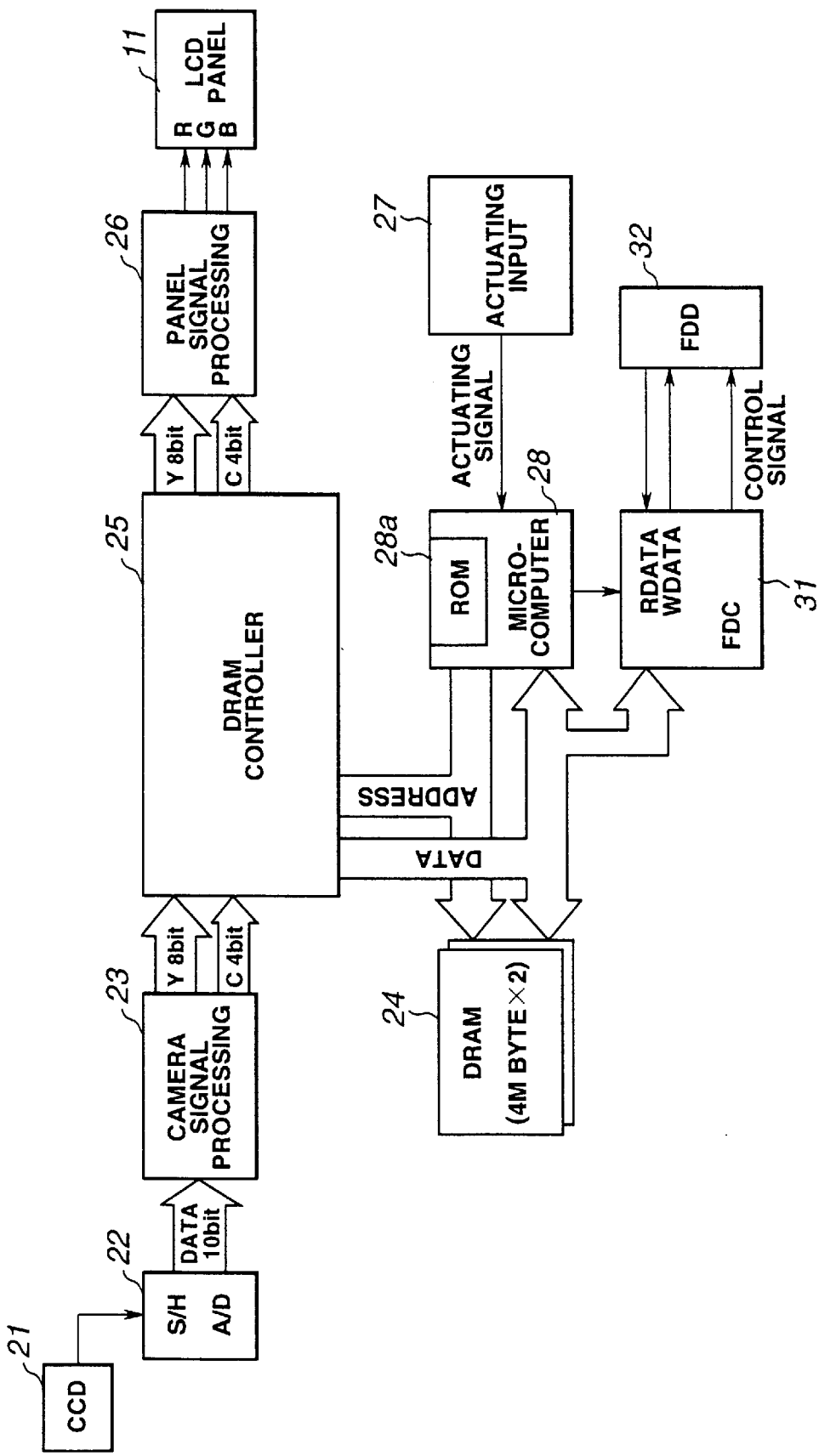
FIG. 3 is block diagram showing the circuit structure of the digital camera device.

The circuit configuration of the digital camera device 1 is hereinafter explained. Referring to FIG. 3, the present digital camera device 1 includes a CCD 21, as a photographing element, a sample-and-hold/analog-to-digital circuit, abbreviated hereinafter to a sample-and-hold circuit 22, a camera signal processing circuit 23, a DRAM 24 and a DRAM controller 25. The digital camera device 1 also includes a panel signal processing circuit 26, an actuating input unit 27, a micro-computer 28, a floppy disc controller or FDC 31 and the floppy disc drive or FDD 32, already explained with reference to FIG. 2. The panel signal processing circuit 26 furnishes RGB signals to the LCD panel 11. The digital camera device 1 also includes a flash memory 29 as an additional constituent element. The DRAM 24, DRAM controller 25, micro-computer 28, flash memory 29 and the FDC 31 are interconnected over a common bus.

In the digital camera device 1, light rays from an object are passed through the objective lens 4 and received by the CCD 21 so as to be thereby converted into electrical signals. An output signal from the CCD 21 is sample-held by the sample-and-hold circuit 22 and subsequently converted by A/D conversion into 10-bit digital signals. The converted 10-bit signals are sent to the camera signal processing circuit 23.

The camera signal processing circuit 23 processes the 10-bit digital signals supplied from the sample-and-hold circuit 22 in a pre-set manner to output the processed signals to the DRAM controller 25. The camera signal processing circuit 23 in the present embodiment generates 8-bit luminance signals Y and 4-bit chroma signals C from the input signal to output the signals Y and C to the DRAM controller 25.

The DRAM controller 25 directly sends the luminance signals Y and the chroma signals C from the camera signal processing circuit 23 to the panel signal processing circuit 26. If the CCD 21 is not of the tetragonal lattice structure, the camera signal processing circuit 23 forms the luminance signals Y and the chroma signals C into signals of the tetragonal lattice structure to send the resulting signals to the panel signal processing circuit 26, which then generates red signals R, green signals G and blue signals B from the input luminance signals Y and chroma signals C to output the R, G and B signals to the LCD panel 11. This displays an image of the photographing object on the LCD panel 11.

The DRAM controller 25 also causes the luminance signals Y and the chroma signals C from the camera signal processing circuit 23 in pre-set areas of the DRAM 24 under control from the camera signal processing circuit 23. The DRAM 24 is made up of two 4 MB DRAMs, and thus has a storage area of 8 MBs.

The actuating input unit 27 detects the actuation contents of the shutter button 3 and the actuating buttons/switches 12a to 12g to output the detected signals as actuating signals to the micro-computer 28.

The micro-computer 28 is of the reduced instruction set computer RISC type capable of high-speed processing, and includes a read-only memory (ROM) 28a holding on memory a software program for controlling the respective blocks. The micro-computer 28 is responsive to actuating signals from the 3. actuating input unit 27 to cause the software program in the ROM 28a to be executed to perform the processing such as picture companson or file management during the photographing, reproduction and editing.

Specifically, the micro-computer 28 causes the luminance signals Y and the chroma signals C to be stored during photographing of an object in a pre-set area of the DRAM 24 from the DRAM controller 25 in order to compress the stored luminance signals Y and chroma signals C in accordance with the JPEG (Joint Photographic Coding Experts Group) system. The micro-computer 28 also causes the data compressed in accordance with the JPEG system to be written in an area different from the above-described area of the DRAM 24 as JPEG stream data. The micro-computer 28 also causes JPEG stream data to be read out from the DRAM 24 to convert the JPEG stream data into MS-DOS (Microsoft Disc operating System, a trademark owned by MICROSOFT INC) format data to supply the converted data to the FDC 31. The micro-computer 28 controls the FDC 31 in order to write the data converted into the MS-DOS format data on a magnetic disc 9 of the floppy disc cartridge 8 loaded on the floppy disc drive 32.

FIG. 4 shows the address space of the micro-computer 28. In FIG. 4, the micro-computer 28 has an area 0000000~0fffffff as an area of an enclosed ROM, an area 2000000~2fffff as an area for the FDC 31, an area 5000000~5fffff as an area the enclosed peripheral module, an area 9000000~9fffff as an area for the DRAM 24, an area e000000~efffff and an area f000000~ffffff as an area for the enclosed RAM.

Figure 5:
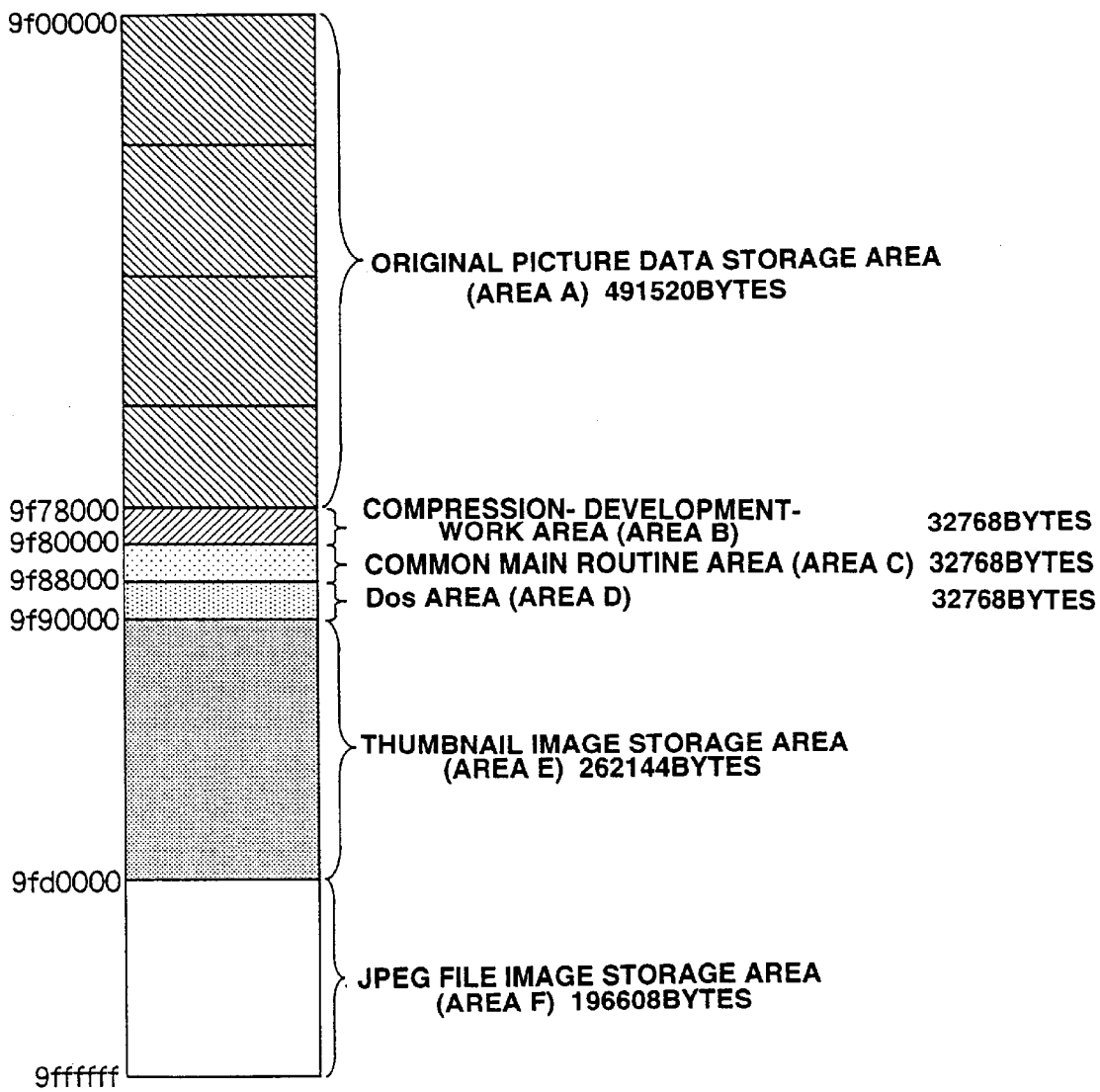
FIG. 5 represents a data area of a DRAM.

FIG. 5 shows a data area for the above-mentioned DRAM 24 of a sum total of 8 MBs. The DRAM 24 has an area 9f00000~9f77fff of 491025 bytes as an original picture data storage area for storage of picture data for a sole main picture displayed on the LCD panel 11 (referred to hereinafter as area A). The DRAM 24 also has an area 9f78000~9f7ffff of 32768 bytes as a compression-expansion operating area for compression of the original picture data or expansion to original picture data (referred to hereinafter as area B). This area B also operates as an area for generating thumbnail data from the original picture data.

The DRAM 24 has an area 9f80000~9f87fff of 32768 bytes as a main routine common area as an operating area for the micro-computer 28 to execute a main routine during recording and reproduction (referred to hereinafter as area C), as will be explained in detail subsequently.

The DRAM 24 has an area 9f88000~9f8ffff of 32768 bytes allocated to a thumbnail picture storage area for storage of the file for thumbnail picture data (referred to hereinafter as area D), while having an area 9f90000~9fcffff of 262144 bytes and an area 9fd0000~9fffff of 19608 bytes allocated to a thumbnail image storage area for storage of thumbnail picture data (referred to hereinafter as area E) and to a JPEG file image storage area for storage of a file of main picture data generated under compression in accordance with the JPEG system (referred to hereinafter as area F), respectively.

Moreover, the digital camera device 1 includes an acceleration sensor 33 for detecting the impact from outside, an amplification circuit 34 for amplifying an output signal from the acceleration sensor 33 and a flip-flop 35 for setting an output signal from the amplification circuit 34. The acceleration sensor 33 outputs a detection signal in case of detection of an impact exceeding a pre-set G-value in a manner as will be explained in detail subsequently.

An output of the flip-flop 35 is supplied not only to the micro-computer 28 but also to the floppy disc drive 32 via one of input terminals of an AND gate 36. The micro-computer 28 also outputs a reset signal to the flip-flop 35.

The AND gate 36 has its opposite side input terminal connected to an output side of the FDC 31 for control signals and has its output terminal connected to the floppy disc drive 32 so as to perform the function as a gate (W gate) for issuing a permit/non-permit command for the recording operation by the floppy disc drive 32, as shown in FIG. 4. The acceleration sensor 33 will be explained in detail subsequently.

Figure 7:
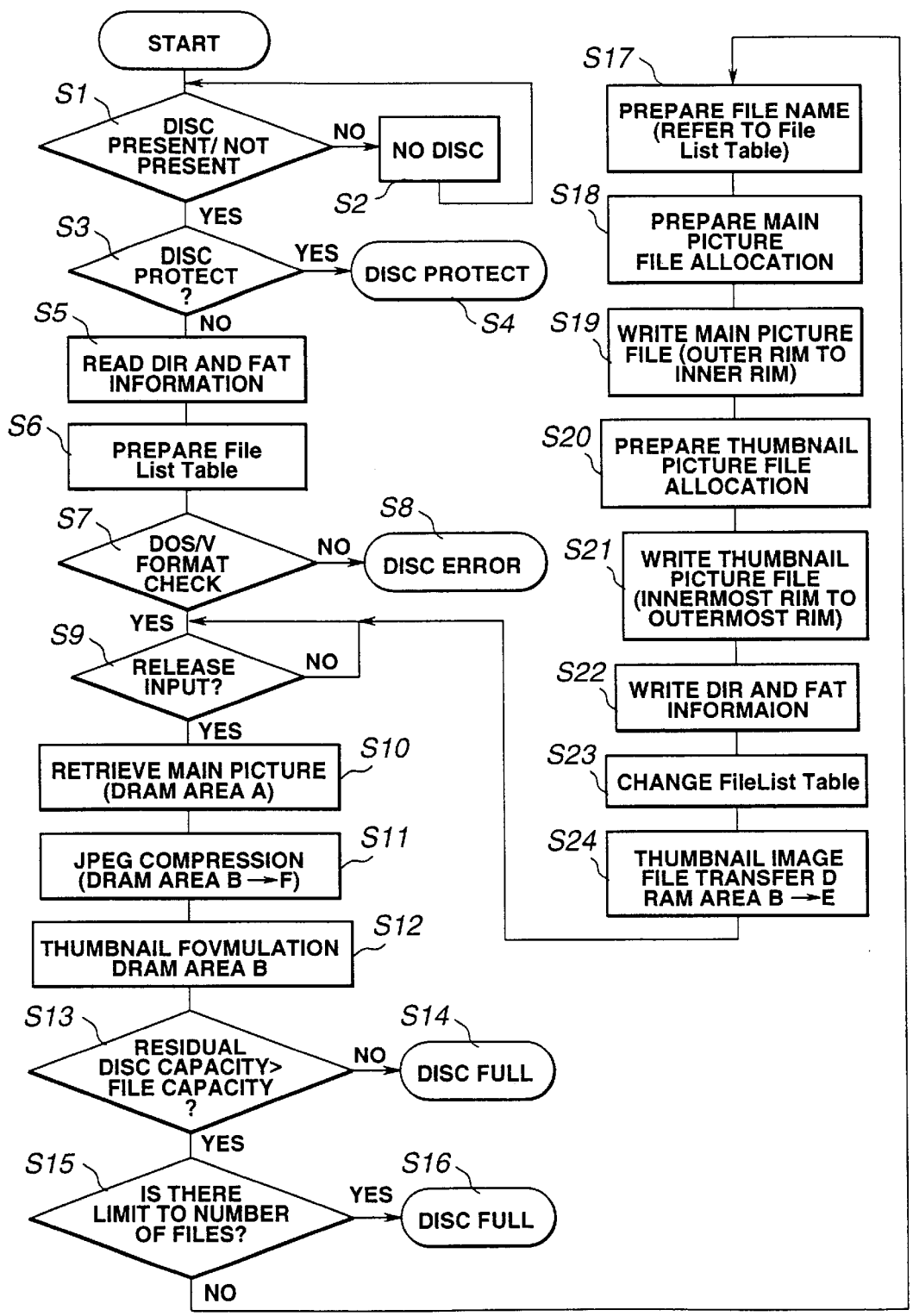
FIG. 7 is a flowchart for illustrating the control operation during data recording in the digital camera device.

The control operation during data recording in the digital camera device 1 is hereinafter explained with reference to FIG. 7.

At step S1 after power up, the micro-computer 28 judges whether or not the floppy disc cartridge 8 has been loaded in position. If the floppy disc cartridge 8 is judged to have been loaded in position, the micro-computer 28 proceeds to step S3 and, if otherwise, to step S2.

At step S2, the micro-computer 28 causes the LDC panel 11 to display "no disc" by way of an alarm to the user, and is in a standby state until the floppy disc cartridge 8 is loaded in position.

At step S3, the micro-computer 28 detects whether or not write protection is applied to the floppy disc cartridge 8, in order to judge whether or not writing on the magnetic disc 9 is possible. If the write protection is applied to the floppy disc cartridge 8, the micro-computer 28 proceeds to step S4 and, if otherwise, to step S5.

At step S4, the micro-computer 28 issues an alarm to the effect that writing cannot be made to terminate the processing. Specifically, a legend such as "disc protect" is displayed on the LCD panel 11.

At step S5, the micro-computer 28 controls the FDC 31 to reproduce a track 00 on the outermost rim of the magneto-optical disc 9 by the floppy disc drive 32 to read data recorded in the route directory in this track or in the file allocation table (FAT) area to extract the information such as the filename or the address present in the data area of the magnetic disc 9.

At the next step, S6, the micro-computer 28 formulates a file list table in which to list the various items of the information extracted. The micro-computer 28 then lists the various sorts of the information extracted before proceeding to step S7.

At step S7, the micro-computer 28 checks whether or not the magnetic disc 9 is formatted in accordance with the DOS/V style. If the result is affirmative, the micro-computer 28 proceeds to step S9 and, if otherwise, to step S8.

At step S8, to which the micro-computer 28 proceeds if the magnetic disc 9 is not formatted in accordance with the DOS/V style, the micro-computer 28 causes the legend "disc error" to be displayed on the LCD panel 11 to terminate the processing.

The micro-computer 28 is in a standby state at step S9 until release input. That is, the micro-computer 28 is in a standby state at step S9 until pressing of the shutter button 3 and proceeds to step S10 when the shutter button 3 is pressed.

At step S10, the micro-computer 28 causes picture data obtained on photographing an object in the area A of the DRAM 24 shown in FIG. 5 to retrieve the main picture.

At the next step 511, the micro-computer 28 compresses the picture data stored in the area A of the DRAM 24 in the area B in accordance with the JPEG system to generate main picture data, which is then stored in a file style in then area F of the DRAM 24.

At the next step S12, the micro-computer 28 decimates the main picture data, retrieved at step S10, to a pre-set data volume on the pixel basis in order to generate thumbnail picture data as sub-samples of the main picture. These thumbnail picture data are stored in the file style in the area B of the DRAM 24. Meanwhile, the digital camera device 1 decimates the data so that the thumbnail picture file will be of a pre-set capacity.

At the next step S13, the micro-computer 28 before proceeding to recording of each data refers to the above-mentioned file list table in order to check the residual recording capacity of the magnetic disc 9. The micro-computer 28 compares the residual recording capacity to the sum of the recording capacity of the main picture data stored in the area F at step S11 and that of the thumbnail picture data stored in the area E at step S12 in order to check whether or not the residual capacity of the magnetic disc 9 suffices. If the residual capacity is judged to be sufficient, the microcomputer 28 proceeds to step S15 and, if otherwise, to step S14.

At step S14, the micro-computer 28 causes the legend "disc full" to be displayed on the LCD panel 11 to issue an alarm to the user to terminate the processing.

At step S15, the micro-computer 28 refers to the file list table to check the number of files already recorded on the magnetic disc 9 in order to judge whether or not limitations are imposed on the number of files. Specifically, it is judged whether or not limitations are imposed in case of adding the filenames of two files, namely the main picture file and the thumbnail picture file, to the track 00 of the magnetic disc. If limitations are imposed, that is if filenames can no longer be added, the micro-computer 28 proceeds to step S16. If otherwise, the micro-computer 28 proceeds to step S17.

At step S16, as at step S14, the micro-computer 28 causes the legend "disc full" to be displayed on the LCD panel 11 in order to issue an alarm to the user to terminate the processing. That is, at steps S13 and S15, it is judged whether or not, with the current state of the magnetic disc 9, the main picture file and the thumbnail picture file can be recorded in the disc.

Figure 8:
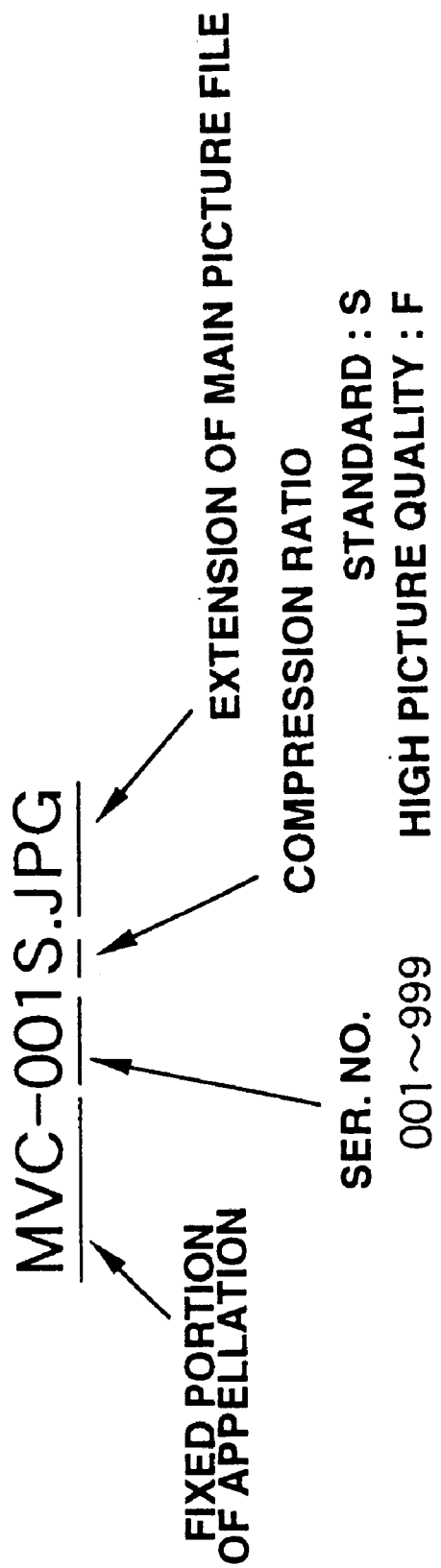
FIG. 8 illustrates filenames of main picture files.

At step S17, the micro-computer 28 formulates filenames of both the main picture file and the thumbnail picture file. The filename of the first main picture file is "MVC-001S.JPG", as shown in FIG. 8. On the other hand, the filename of the first thumbnail picture file associated with the main picture file is "MVC-001S.411". Specifically, "JPG" and "411" stand for extensions of the main picture file and the thumbnail picture file, respectively, with the main picture file and the thumbnail picture file being the same except these extensions.

It is noted that "MVC-" stands for the fixed appellation used for each main picture file and each thumbnail picture file in common, while "001" stands for the serial number. The above-mentioned file list table is referred to in order to affix different numerals for the main picture files and the thumbnail picture files. The serial numbers range from 001 to 999, with the number obtained on adding 1 to the largest number on the disc being a new number. If, on referring to the file list table, there is a main picture file or a thumbnail picture file having the Ser. No. 999, unused numbers from 001 are allocated.

Further, "S" stands for the degree of data compression of the main picture files and, in the present case, means that the main picture file is a file of data obtained on standard data compression. If the main picture file is data obtained on compression for high picture quality, this portion of the filename is "F".

At the next step S18, the micro-computer 28 formulates a main picture file allocation for recording the main picture file in a pre-set area of the magnetic disc 9. Specifically, an area is secured beginning from the outer rim of the magnetic disc 9 in order to set and hold on memory the area for recording the main picture file.

At the next step S19, the micro-computer 28 controls the FDC 31 to write the main picture file by the floppy disc drive 32 in the area on the magnetic disc 9 as set at step S18.

At the next step S20, the micro-computer 28 formulates a thumbnail picture file allocation for recording the thumbnail picture file in a pre-set area of the magnetic disc 9. Specifically, the micro-computer 28 secures an area beginning from the inner rim of the magnetic disc 9 to set and hold on memory the area for recording the thumbnail picture file.

At the next step S21, the micro-computer 28 controls the FDC 31 to write the thumbnail picture file by the floppy disc drive 32 in the area on the magnetic disc 9 as set at step S20.

Figure 9:
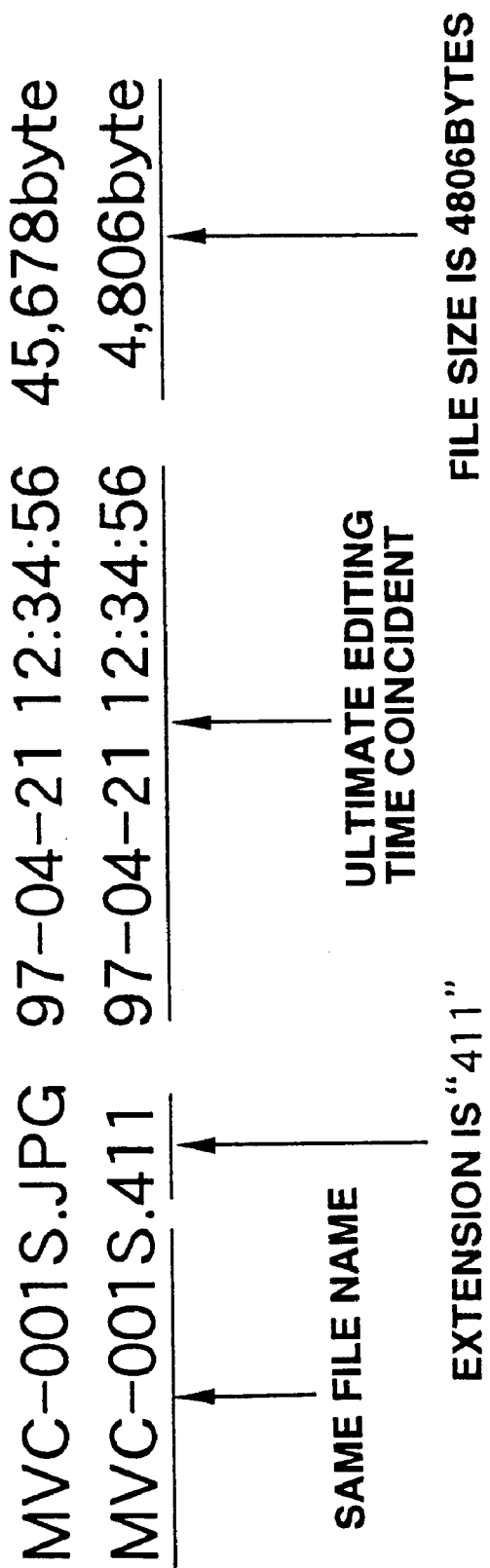
FIG. 9 illustrates the information on the filenames, recording time or file size of the main picture files and the thumbnail picture files.

At the next step S22, the micro-computer 28 controls the FDC 31 to write in the root directory area and the file allocation table (FAT) area on the magnetic disc 9 by the floppy disc drive 32 the information on the filenames, recording time and file size of the main picture files and the thumbnail picture files recorded at step S19 and S21. This is illustrated in FIG. 9 in which the main picture files and the thumbnail picture files are the same in filenames except the extensions, with the ultimate editing time, herein the recording time, of the two files being also coincident. It is noted that the thumbnail picture files are of a fixed file size of 4806 bytes, while the main picture files are of variable file sizes depending on picture complexity.

At the next step S23, the micro-computer 28 changes the file list table by adding the information with regard to the two types of files in the above to the file list table and proceeds to step S24.

At step S24, the micro-computer 28 transfers the as thumbnail picture files from the area B of the area F of the DRAM 24. After the end of the processing at step S24, the micro-computer 28 reverts to the release input waiting state to step S9, and repeats the processing from step S9 to step S24 subject to the release input.

Figures 10A, 10B:
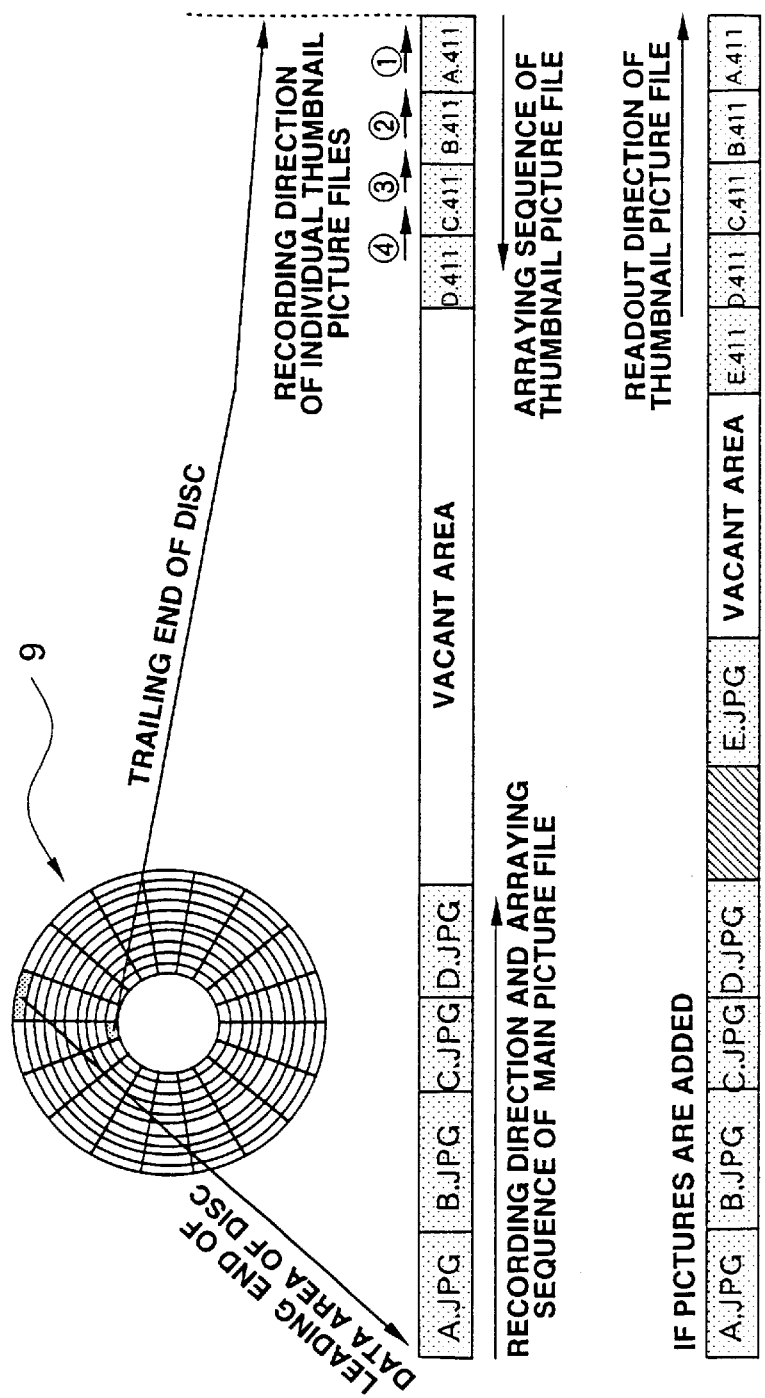
FIG. 10 illustrates the state of the main picture files and the thumbnail picture files recorded on the magnetic disc.

By the above-described processing, the main picture file and the thumbnail picture file are recorded from both ends of the disc, as shown in FIG. 10A. For convenience in illustration, the filenames of the main picture files and the thumbnail picture files are abbreviated to A.JPG, B.JPG, . . . and A.411, B.411, . . . , respectively. FIG. 10A shows how thumbnail picture files A.411, B.411, C.411 and D.411 are recorded when four main picture A.JPG, B.JPG, C.JPG and D.JPG files associated therewith are recorded in this order.

That is, in the present digital camera device 1, the main picture files are sequentially recorded and arrayed, beginning from the leading end of the disc data area, at the same time as the thumbnail picture files are sequentially recorded beginning from the trailing end of the data area. Meanwhile, the recording direction of the individual thumbnail picture files, that is the data writing direction, is the same as the recording direction of the main picture files.

When recording data on the magnetic disc 9 in the non-recorded vacant state, the main picture files and the thumbnail picture files are alternately recorded in physically discrete areas of the magnetic disc 9, while the thumbnail picture data are continuously recorded from one end of the data area of the magnetic disc 9, so that plural thumbnail picture data can be read out promptly as if the data are a sole file, thus significantly reducing the readout time.

Also, since the thumbnail picture data only are recorded in a lump state, redundant data processing is eliminated. Moreover, since it is unnecessary for the main picture file to have the thumbnail information, there is no necessity for having dependence upon the file format of the main picture file.

As for the digital camera device 1, since the main picture files are recorded beginning from the position on the disc opposite to the thumbnail picture files, there is only one comprehensive vacant area on the magnetic disc 9 to allow for effective utilization of the entire data area of the magnetic disc 9 during data recording.

Meanwhile, since the magnetic disc 9, on which the respective data have been recorded by the present digital camera device 1, conforms to the MS-DOS format, data can be copied as usual by the DiscCopy command.

FIG. 10B shows the case in which E.JPG as the fifth main picture file and E.411 as the thumbnail picture file of this main picture file have been additionally recorded beginning from the state of FIG. 10A. Since there is some other data in this case downstream of the fourth main picture file D.JPG on the magnetic disc 9, the probability is high that the fifth thumbnail picture file E.411 shall be recorded in continuation to D.411 even if the recorded fifth main picture file E.JPG is not consecutive to D.JPG. Since the files are usually recorded with the floppy disc drive beginning from the outer rim of the disc, it is a frequent occurrence that the inner rim side of the disc is in an intact state.

Moreover, since the thumbnail picture file has a fixed capacity, the thumbnail picture file F.411, which should be recorded next to the thumbnail picture file C.411, deleted by editing, can be recorded in an area in which this thumbnail picture file C.411 was previously recorded. With the present digital camera device 1, if a specified thumbnail picture file is erased to produce a non-consecutive area for the thumbnail picture files on the magnetic disc 9, a new thumbnail picture file is recorded at the same time on the occasion of next recording in the non-consecutive area produced due to erasure of the thumbnail picture file. This recording method assures continuity of the respective thumbnail picture files on the magnetic disc 9, as will be explained in detail by taking specified examples.

The readout control of the thumbnail picture file at the time of reproduction with the digital camera device 1 is explained with reference to FIG. 11.

In the digital camera device 1, the series of operations of steps S31 to S40, as now explained, are executed after entering the thumbnail readout mode.

The micro-computer 28 controls the FDC 31 at step S31 to cause the floppy disc drive 32 to reproduce the track 00 at the outermost side of the magnetic disc 9 to start reading out the information on the thumbnail files. The micro-computer 28 then proceeds to step S32.

At this step S32, the micro-computer 28 extracts file names of the effective thumbnail picture files. Specifically, the micro-computer 28 refers to the root directory area of the track 00 and the file allocation table (FAT) area to search the relation between the thumbnail picture files and the main picture files in order to judge whether or not the thumbnail picture file is effective based on possible presence of the associated main picture file and in order to extract only the filenames of the effective thumbnail picture file. If the check into the relation between the thumbnail picture files and the main picture files reveals that there is no thumbnail picture file associated with the pre-set main picture file, the micro-computer 28 records the information such as the filenames of the main picture file.

At the next step S33, the micro-computer 28 controls the FDC 31 to array the filenames of the extracted effective thumbnail picture files in the order of physical addresses of the magnetic disc 9.

At the next step S34, the micro-computer 28 formulates a thumbnail management table configured for relating the address of each thumbnail picture file with the main picture files as will be explained subsequently in detail. If there is no thumbnail picture file associated with the pre-set main picture file, as discussed in connection with the step S32, a blank image file, which will be explained in detail subsequently, is allocated to the pre-set main picture file on the occasion of formulation of the thumbnail management table.

At the next step S35, the micro-computer 28 controls the FDC 31 to read out by the floppy disc drive 32 one of the thumbnail picture files located on the outer rim of the magnetic disc 9 in order to store the read-out thumbnail picture file in a pre-set area of the DRAM 24. The micro-computer 28 then proceeds to step S36.

At this step S36, the micro-computer 28 judges whether or not the processing at step S35 has come to a close normally, that is whether or not a sole thumbnail picture file has been read out normally. If the processing is found to have come to a close normally, the micro-computer 28 proceeds to step S38 and, if otherwise, to step S37.

At step S37, to which the micro-computer 28 proceeds after finding that the processing at step S36 has not been terminated normally, the micro-computer 28 performs the processing on the assumption that there is no thumbnail picture file. The micro-computer 28 then proceeds to step S38. Specifically, the micro-computer 28 modifies the thumbnail management table and sets a pointer of establishing association with the above-mentioned blank image.

At step S38, the micro-computer 28 judges whether or not the thumbnail picture files have been read out up to the last file. If the result is affirmative, the micro-computer 28 proceeds to step S40 to terminate the processing and, if otherwise, the micro-computer 28 proceeds to step S39.

At step S39, the micro-computer 28 prepares for reading out the next thumbnail picture file before reverting to the above-mentioned step S35. Thus, the micro-computer 28 repeats the processing from step S35 to step S39 until reading all effective thumbnail picture files.

The operation in case data have been deleted from the magnetic disc is explained by referring to the drawings. For convenience in explanation, the filenames of the main picture files and the thumbnail picture files are abbreviated to 001.JPG, 002.JPG, . . . and 001.411, 002.411, . . . , respectively.

FIG. 12 shows hysteresis concerning data recording and deletion on or from a given magnetic disc 9*a*. That is, in this magnetic disc 9*a*, a thumbnail picture file 005.411 associated with the fifth main picture file 005.JPG, has not been recorded by some reason at the time of recording of the fifth main picture file, as shown in FIG. 12. With the present magnetic disc 9*a*, the main picture file 003.JPG and the associated thumbnail picture file 003.411 are deleted after recording the main picture files 001.JPG to 009.JPG and the associated thumbnail picture files 001.411 to 009.411 excluding 005.411 and the main picture file 010.JPG and the associated thumbnail picture file 010.411 are recorded after this deletion.

Figure 11:
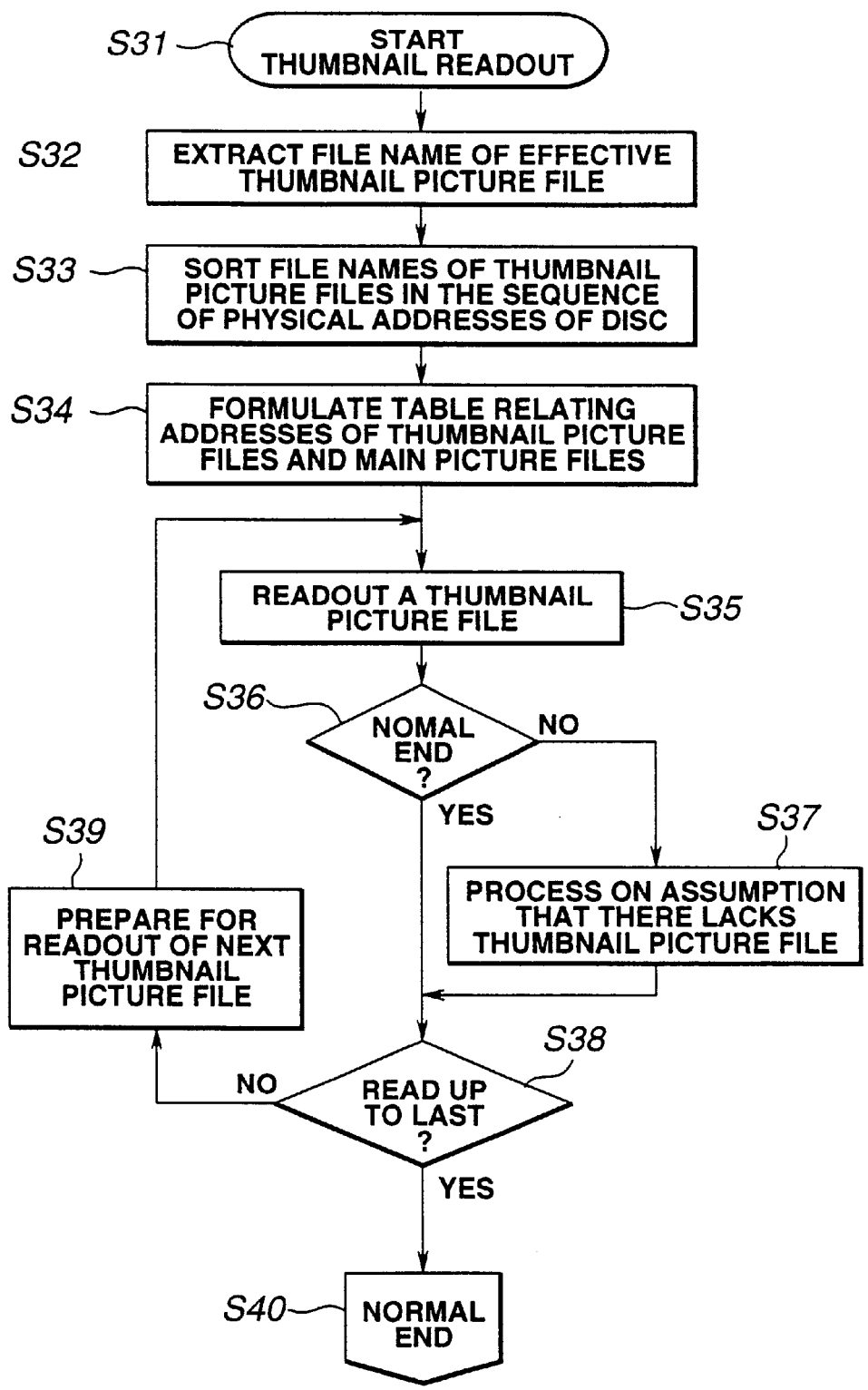
FIG. 11 is a flowchart for illustrating readout control of the thumbnail picture files during reproduction in the digital camera device.

The operation during reproduction of the present magnetic disc 9*a* is explained by referring to the flowchart of FIG. 11.

At step S31, reproduction of the track 00 of the magnetic disc 9*a* is started by the floppy disc drive 32.

At step S32, 001.411, 002.411, 004.411, 006.411, 007.411, 008.411, 009.411 and 010.411 are extracted as filenames of effective thumbnail picture files. Since there is if no thumbnail picture file (005.411) associated with the main picture file 005.JPG, a pointer is set at the filename of the main picture file 005.JPG.

At the next step S33, the filenames of the extracted effective thumbnail picture files are re-arrayed in the order of the physical addresses in the magnetic disc 9. In this case, the re-arraying sequence is 009.411, 008.411, 007.411, 006.411, 004.411, 010.411, 002.411 and 001.411. That is, since the thumbnail picture files are recorded beginning from the innermost rim of the magnetic disc 9*a* and 010.411 is recorded after deleting 003.JPG and 003.411, the thumbnail picture file 010.411 is recorded in an area between the thumbnail picture files 004.411 and 002.411.

At step S34, the thumbnail management table shown for example in FIG. 13 is formulated. This thumbnail management table has columns for file numbers, main picture files and the associated thumbnail addresses. In the present embodiment, the columns of the file numbers and the main picture files are arrayed in the recording sequence of the main picture files. In the column of the associated thumbnail addresses is stated the leading address in the area E for storage in this area of DRAM 24 in accordance with the sequence of the re-arraying performed at step S33. As for the main picture file 005.JPG, for which there lacks the associated thumbnail picture file, a leading address of, for example, 0, is recorded as the leading address of the area on the DRAM 24 in which is stored the blank image file.

At the next step S35, the thumbnail picture file 009.411, located at the outer rim of the magnetic disc 9a, is read out and stored in an area up to an address number of a~b−1 of the area E in the DRAM 24. At step S36, it is judged that this thumbnail picture file has been read out normally. If the thumbnail picture file 009.411 has not been read out normally at step S35, the column of the address of the associated thumbnail in the thumbnail management table is rewritten at step S37 to 0.

Figure 14:
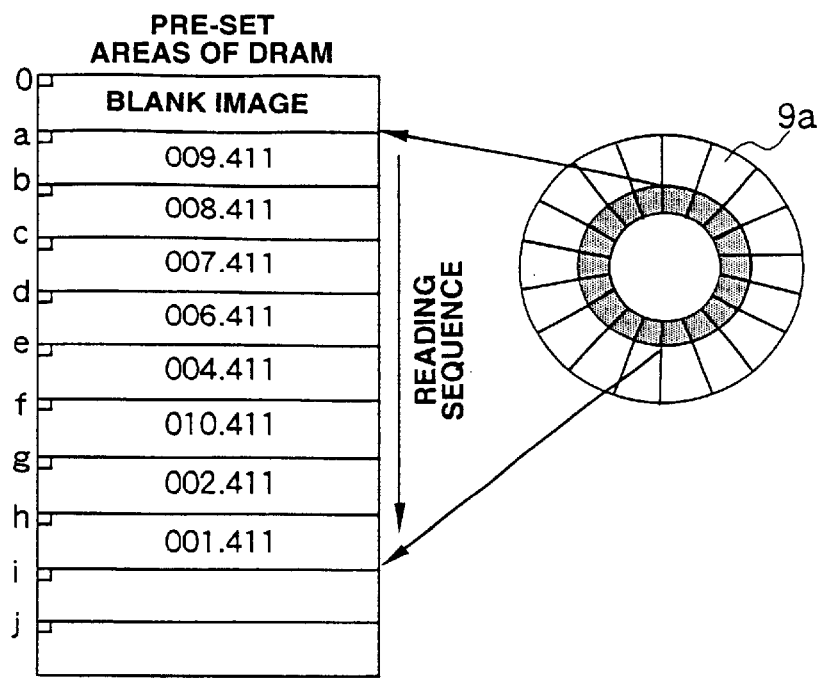
FIG. 14 illustrates the state in which a thumbnail picture file is stored from a magnetic disc to a pre-set area on the DRAM.

At step S38, if not all thumbnail picture files are read out, processing transfers to step S39 to repeat the processing at steps S35 to S39 so that the thumbnail picture files are stored in the area E of the DRAM 24 in the sequence of 008.411, 007.411, 006.411, 004.411, 010.411, 002.411 and 001.411, as shown in FIG. 14.

Since the thumbnail picture file 005.411 has not been recorded in the magnetic disc 9a, 006.411 is read after 004.411 in the pre-set area of the DRAM 24. Since there is the main picture file devoid of the thumbnail picture file on the magnetic disc 9a, a blank image displayed in place of the thumbnail file in the absence thereof is stored in a pre-set area (area a~b−1 in FIG. 14) of the DRAM 24.

After all of the thumbnail picture files in the magnetic disc 9a have been stored in the DRAM 24, the micro-computer 28 controls the DRAM controller 25 and the panel signal processing circuit 26 for displaying six thumbnails on the LCD panel 11. Reference is had at this time to the thumbnail management table in order to display the thumbnails on the LCD panel 11.

Figure 15:
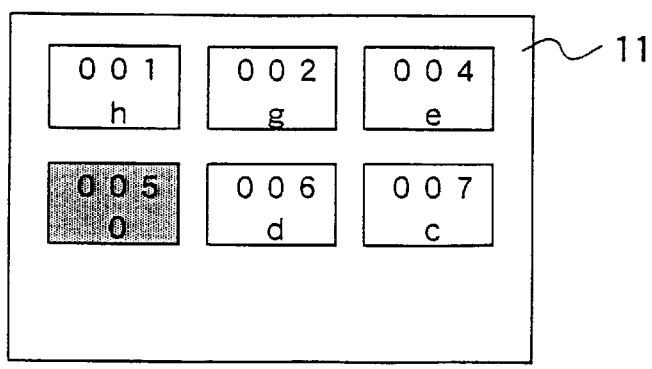
FIG. 15 illustrates the state of display of thumbnail pictures and o forth on a LCD panel.

This causes six thumbnails to be displayed on the LCD panel 11, as shown in FIG. 15. Since there is no thumbnail picture file associated with 05.JPG, the filename of the main picture may be displayed in a grey picture having the same size as other photographed pictures.

With the digital camera device 1, the main picture file associated with one of the six displayed thumbnails is read out from the magnetic disc 9a based on the actuating signals of the actuating input unit 27. This main picture file is stored in a pre-set area of the DRAM 24 and expanded by the micro-computer 28 in accordance with the JPEG system for display subsequently on the LCD panel 11 to an enlarged size.

Figure 16:
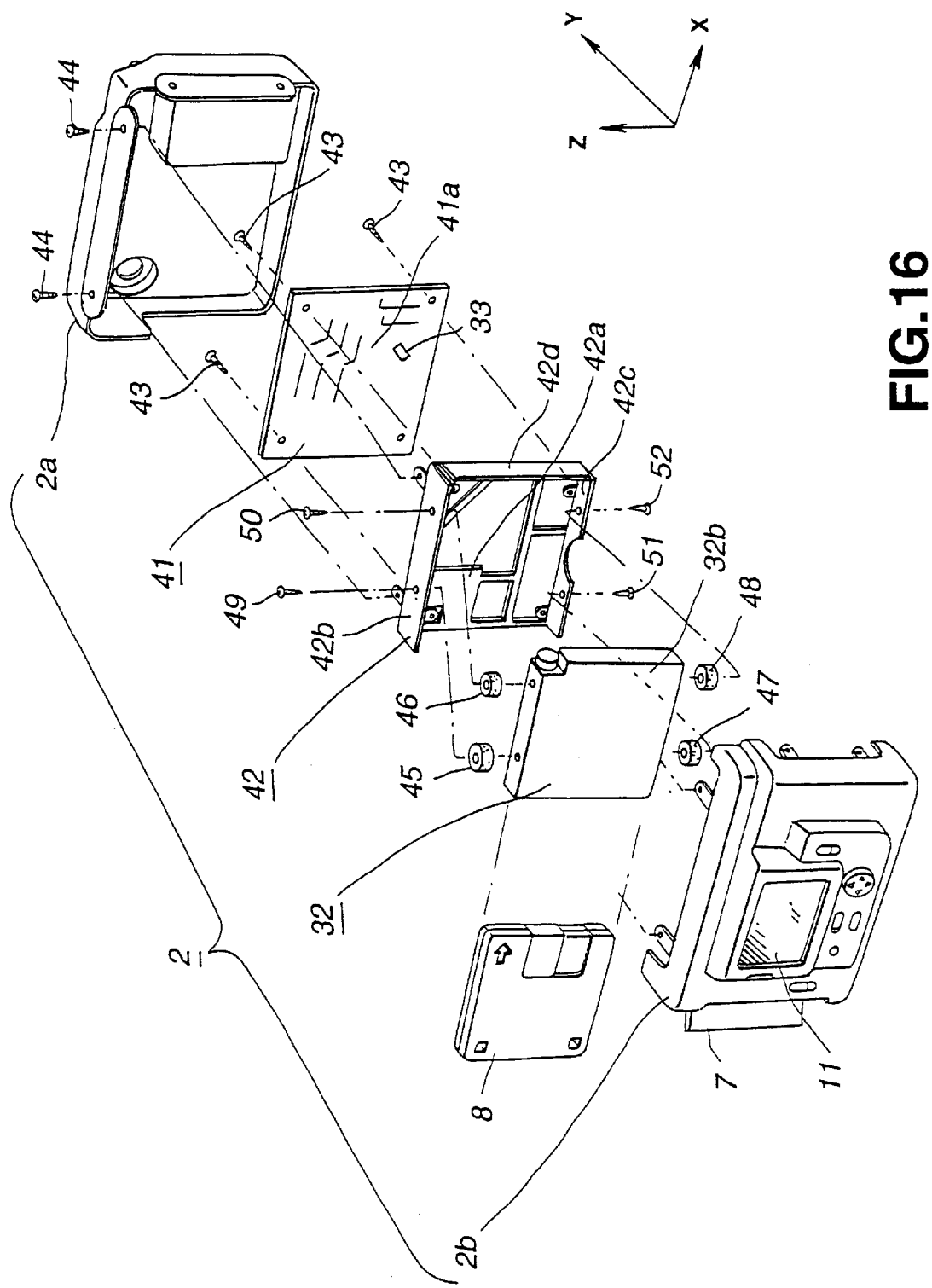
FIG. 16 is an exploded perspective view for illustrating the mechanical structure of the digital camera device.

The internal mechanical structure of the digital camera device 1 is now explained. Referring to FIG. 16, the casing 2 of the digital camera device 1 can be exploded into a front side half 2a and a rear side half 2b. In these front and rear side halves 2a and 2b are arranged a circuit substrate 41, a chassis 42 and the floppy disc drive 32. Specifically, the circuit substrate 41, chassis 42 and the floppy disc drive 32 are in the form of substantially co-extensive rectangles and arranged in the inside of the casing 2 so that the rectangles overlap with one another.

More specifically, the circuit substrate 41 has its four corners secured by plural set screws 43 on one of the major surfaces of the chassis 42 facing the front side half 2a, as shown in FIG. 16. Also, the floppy disc drive 32 is mounted via four buffer members 45, 46, 47 and 48 for facing the opposite side major surface of the chassis 42 facing the rear side half 2b. The chassis 42, carrying the circuit substrate 41 and the floppy disc drive 32, is secured to the front side half 2a of the casing 2 by set screws 44 from the upper side and from the lateral side by set screws, not shown.

Figure 6:
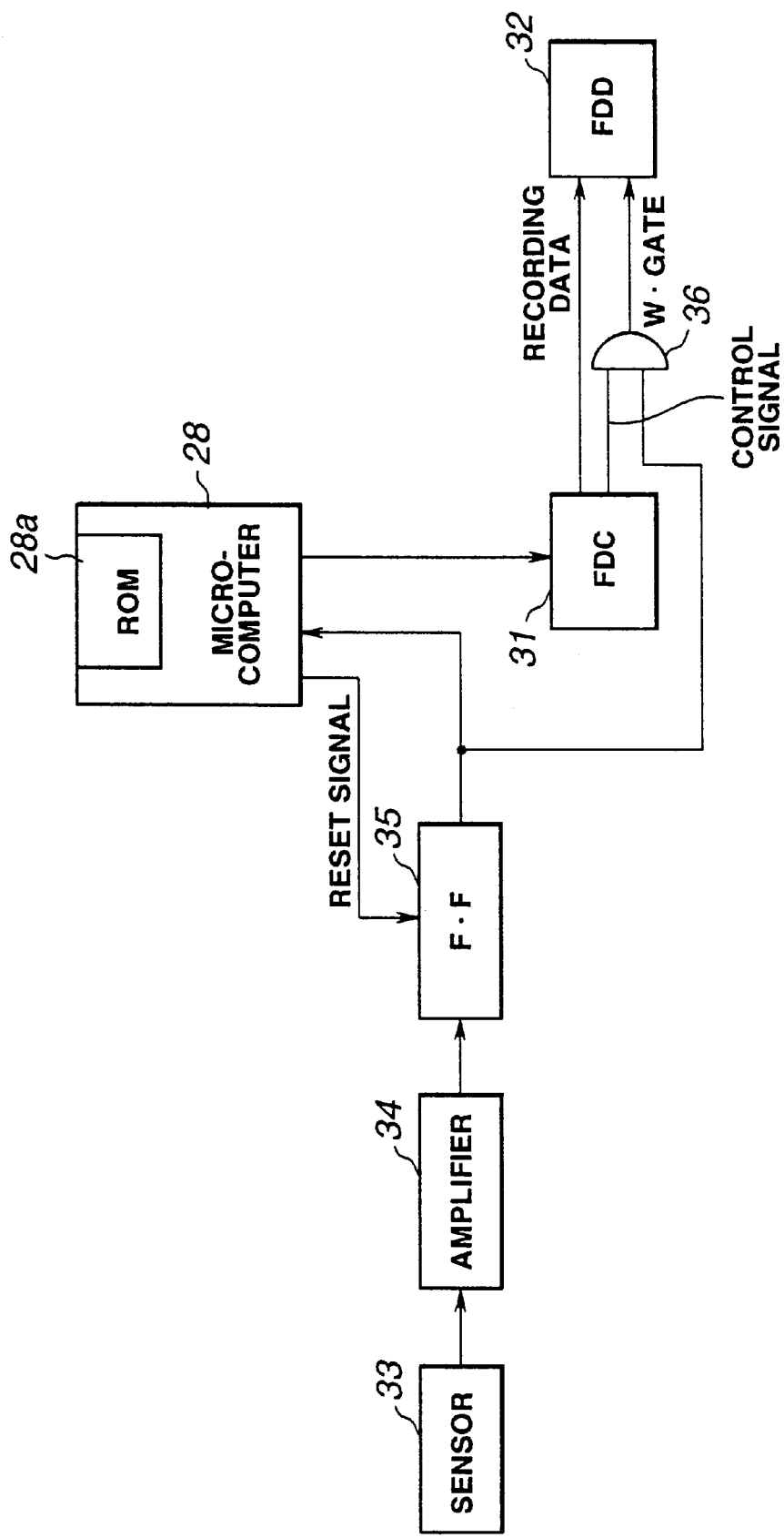
FIG. 6 is a block diagram showing the circuit structure of the digital camera device.
Figure 17:
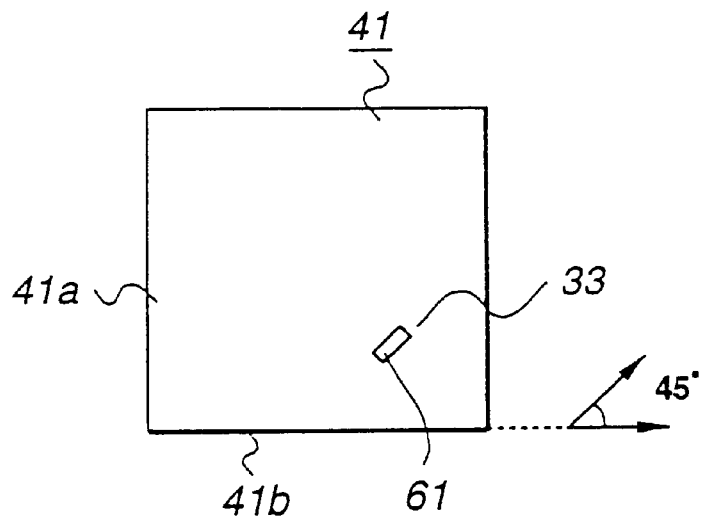
FIG. 17 illustrates the mounting angle on a circuit substrate of an acceleration sensor.

The circuit substrate 41 is substantially rectangular in shape in its entirety and has a variety of chips, such as LSIs, operating as blocks of the circuit shown in FIGS. 3 and 6. On the major surface 41a of the circuit substrate 41 facing the rear side half 2b is mounted the above-mentioned acceleration sensor 33 having a substantially rectangular profile, as shown in FIG. 6. Specifically, the acceleration sensor 33 is mounted at an approximately lower rightward side of the major surface 41a of the circuit substrate 41 so that the long side of a substantially rectangular casing 61 is at an angle of approximately 45° relative to a lower side 41b of the circuit substrate 41, as shown in FIG. 17. The acceleration sensor 33 will be explained further in detail subsequently.

The chassis 42 is molded from metal, such as stainless steel, and has its major surface 42a recessed significantly. An upper flange 42b, a lower flange 42c and a side flange 42d are formed from the upper edge, lower edge and the right-side edge (FIG. 16) of the major surface 42a of the chassis 42, respectively, in a direction facing the rear side half 2b.

The floppy disc drive 32 is of a thin type of a so-called ½ height having a casing 32 of metal. This floppy disc drive 32 is mounted on the chassis 42 by set screws via the four buffer members 45, 46, 47 and 48. Specifically, the upper flange 42b and the lower flange 42c of the chassis 42 and the buffer members 45 to 48 are provided with bores adapted to be passed through by set screws 49 to 52. These set screws 49 to 52 are passed through these bores and screwed into tapped holes formed in the corresponding positions of the floppy disc drive 32 for securing the floppy disc drive 32 to the chassis 42.

Figure 18:
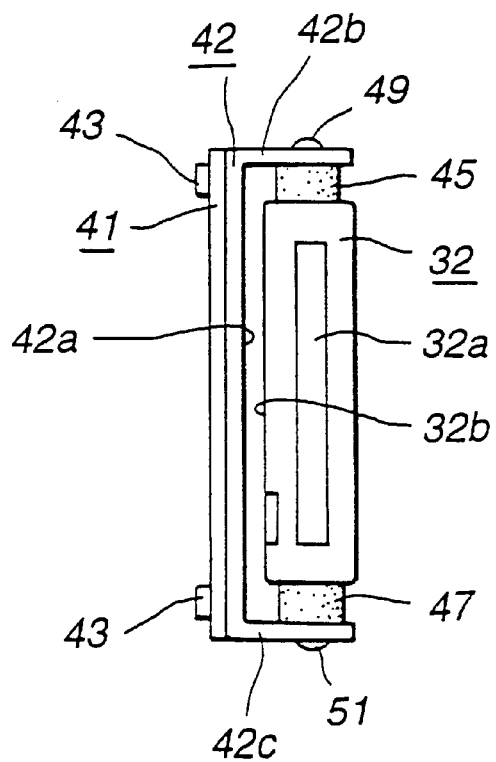
FIG. 18 illustrates the mounting state of the circuit substrate and the floppy disc drive looking from the cartridge inserting opening side.

Referring to FIG. 18, showing the mounting state of the circuit substrate 41 and the floppy disc drive 32 to the chassis 42 looking from the side of the cartridge inserting opening 32a, the casing 32b of the floppy disc drive 32 is not directly contacted with the major surface 42a of the chassis 42, such that the vibrations or impacts applied to the chassis 42 are transmitted via the buffer members 45 to 48 to the floppy disc drive 32. As for the relation between the chassis 42 and the circuit substrate 41, since the circuit substrate 41 has its four corners secured to the major surface 42a of the chassis 42 by set screws 43, the vibrations or impacts applied to the chassis 42 are directly transmitted to the circuit substrate 41.

The buffer members 45 to 48 function to delay the time which elapses until the impact applied to the casing 2 from outside is transmitted to the floppy disc drive 32, and are formed of a relatively soft material, such as rubber, sponge, silicon or soft plastics. The buffer members 45 to 48 also function to weaken the impact applied to the casing 2 to some extent to transmit the thus weakened impact to the floppy disc drive 32.

In the present embodiment, the floppy disc drive 32 and the casing 2 are interconnected via the chassis 42.

Alternatively, the floppy disc drive 32 and the casing 2 may also be interconnected without interposition of the chassis 42. In this case, it suffices if the casing 2 is provided with bores for traversing by the set screws 49 to 52 and the floppy disc drive 32 is mounted on the casing via the buffer members 45 to 48 by inserting the set screws 49 to 52 into these bores.

Figure 19:
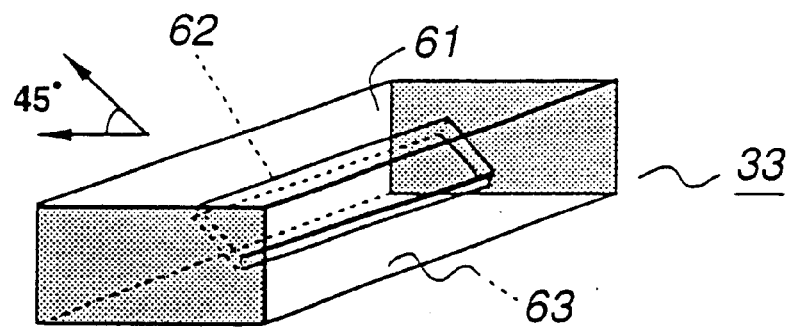
FIG. 19 is a see-through perspective view for illustrating the structure of the acceleration sensor.
Figure 20:
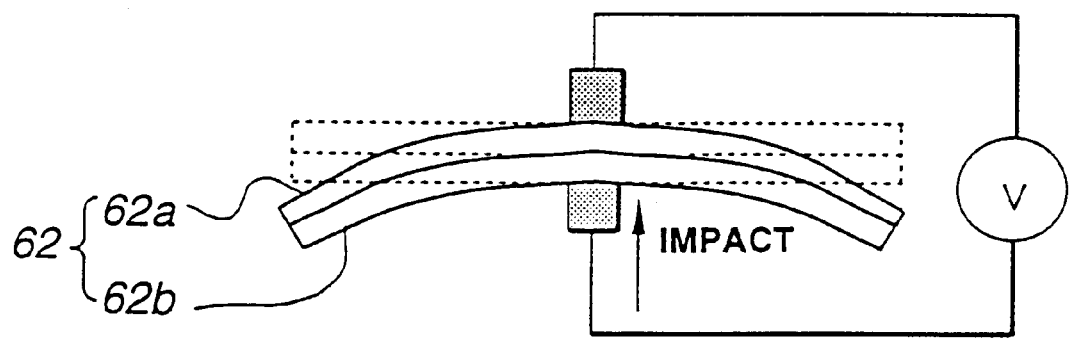
FIG. 20 illustrates the operation of the acceleration sensor on impact application.

Referring to the see-through perspective view of FIG. 19, an impact detection plate 62 for detecting the impact is arranged in the inside of the casing 61 of the acceleration sensor 33. This impact detection plate 62 is substantially rectangular in profile in its entirety. Specifically, the impact detection plate 62 is formed as a thin girder by two piezo-electric ceramic plates 62a, 62b having electrodes at mid positions on its major surface, as shown in FIG. 20. The impact detection plate 62 has its longitudinal ends secured within the casing 61 and has the mid portions of the major surface thereof movable within the casing 61. Thus, if an impact is applied in the in-plane direction of the impact detection plate 62, this impact detection plate 62 is warped arcuately to issue a signal proportionate to the intensity of the applied impact.

This impact detection plate 62 is arranged in the inside of the casing 61 so that its long sides are parallel to the long side of the casing 61 and so that its both major surfaces are inclined at an angle of 45° to the bottom surface 63 of the casing 61, as shown in FIG. 19. The bottom surface 63 represents the attachment surface to the circuit substrate 41.

By mounting the acceleration sensor 33 so that the long side of the casing 61 is inclined 45E relative to the lower side 41b of the major surface 41a of the circuit substrate 41, as shown in FIG. 17, impacts applied from a variety of directions can be detected. Meanwhile, it has been confirmed experimentally that, by mounting the acceleration sensor 33 at this angle, impact detection signals of a uniform strength an be obtained without regard to the direction of application of the impacts. That is, in the digital camera device 1, since the acceleration sensor 33 is mounted so that the major surface of the impact detection plate 62 of the acceleration sensor 33 will be approximately at an angle of 45E relative to the three axes X, Y and Z shown in FIG. 16 in case the casing 2 is used in the basic position shown in FIGS. 1 and 2, the impacts from the axial directions of X, Y and Z can be detected uniformly, such that a sufficient function can be manifested by a sole acceleration sensor.

Figure 21A:
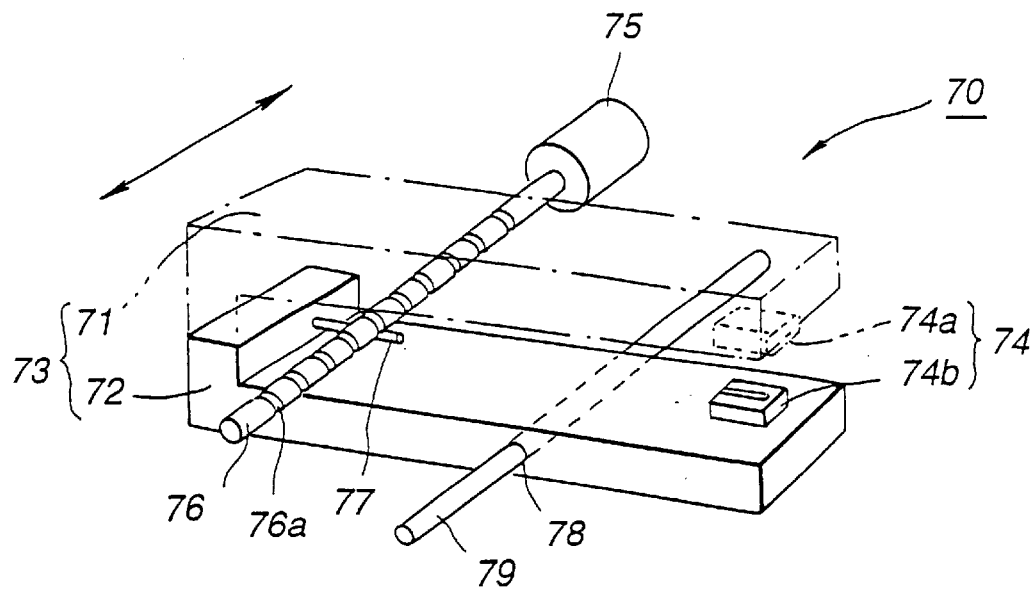
FIG. 21 illustrates the structure of a magnetic head arranged in the casing of the floppy disc drive.

FIG. 21 shows the mechanism around a magnetic head arranged in a casing 32b of the floppy disc drive 32. Within the casing 32b of the floppy disc drive 32 is mounted a head actuator 70, as shown in FIG. 21A. This head actuator 70 includes a head arm 73 formed as-one with upper and lower arm members 71, 72, upper and lower magnetic heads 74 (74a, 74b) mounted on the distal ends of the arm members 71, 72, a feed motor 75 for moving the head arm 73 and a feed screw 76 mounted on a rotor of the feed motor 75. The head actuator 70 also includes a pin 77 mounted on the distal end of the arm member 73 for engagement with a spiral groove 76a formed in the feed screw 76 and a guide shaft 79 mounted in a through-hole 78 formed in the arm member 72 for guiding the movement of the head arm 73.

Figure 21B:
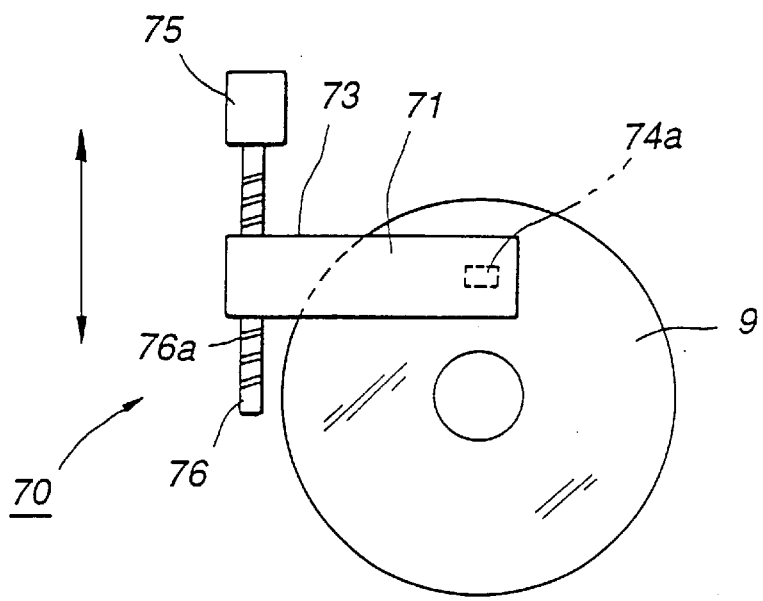

The arm members 71, 72 are molded from, for example, synthetic resin, and has upper and lower paired magnetic heads 74, 74 at the distal ends thereof, these magnetic heads being positioned on both sides of the major surfaces of the magnetic disc 9, as shown in FIG. 21B. Although not shown, a spindle motor for rotationally driving the magnetic disc 9 is mounted below the mid position of the major surface of the magnetic disc 9.

With the above-described head actuator 70, the magnetic head 74 is slid against the major surface of the magnetic disc 9, run in rotation by the spindle motor, for applying a magnetic field on the recording track of the magnetic disc or detecting magnetic signals recorded on the recording track of the magnetic disc in order to record or reproduce main picture data or thumbnail picture data.

The head arm 73 of the head actuator 70 is reciprocated along a guide shaft 79 in the radial direction of the guide shaft 79, that is in the direction indicated by arrow in FIGS. 21A and 21B. Specifically, when the feed motor 75 is rotated a pre-set rotational angle, the head arm 73 is moved track-by-track on the recording tracks formed on the magnetic disc 9. If a strong impact is applied to the floppy disc drive 32 in its entirety, the casing 32b or the head arm 73 is flexed to cause position offset of the magnetic heads 74a, 74b relative to the recording track of the magnetic disc 9, or failure in contact, thus causing erosion of neighboring tracks during data recording or otherwise causing failure in writing on the current track.

In the case of the 3.5 inch ½ height floppy disc drive, as described above, it has been found by experiments that the G-value of occurrence of writing errors for the current recording tracks is 3G to 12G, with the G-value of occurrence of the erosion to the neighboring tracks being not less than 50G. It is therefore reasonable to select the setting value for impact detection of the acceleration sensor 33 to not less than approximately 50G for preventing erosion to the neighboring tracks and to select the setting value for impact detection of the acceleration sensor 33 to a suitable value ranging between 3 and 12G for preventing error occurrence for the current track as well. It has been found by experiments that an optimum result can be obtained with the present digital camera device 1 by selecting the setting value for impact detection of the acceleration sensor 33 to 7G to 8G, in particular to approximately 8G.

Figure 22:
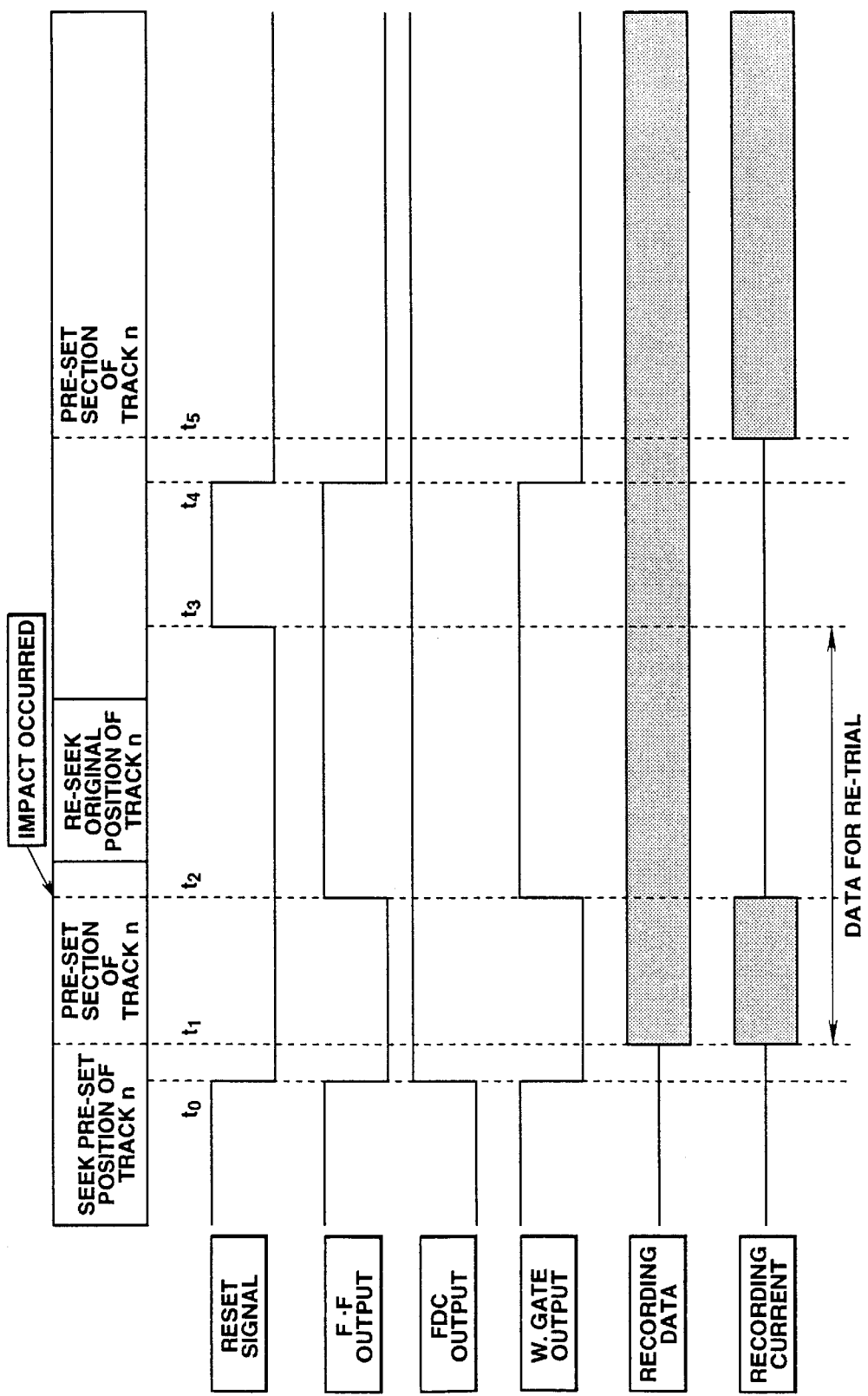
FIG. 22 is a timing chart for illustrating the operation of the acceleration sensor, flip-flop, OR gate, micro-computer and the floppy disc drive and the processing of recorded data.

The operation of the acceleration sensor 33 and the floppy disc drive 32 in case an impact is applied to the casing 2 of the digital camera device 1 from outside is explained with reference to FIG. 22.

In the digital camera device 1, the track number and the sector number on the magnetic disc 9 for recording are set by the micro-computer 28 shown in FIG. 6 prior to proceeding to recording respective data. The track number is herein set to n. The micro-computer 8 then controls the FDC31 to move the magnetic head 74 to the track and sector positions by way of the seek operation.

At a time point t0 corresponding to the end of the seek operation, the micro-computer 28 outputs a reset signal to the flip-flop 35 to reset the output of the flip-flop 35, at the same time as a control signals is outputted from the FDC 31 to invert the output signal of the AND gate 36 to permit the data recording in the FDD 32.

Then, recording data is supplied from the FDC 31 to the floppy disc drive 32 to supply the recording current to the magnetic head 74 so that recording data is written on pre-set sectors of the track n as from time t1. The time between t0 and t1 stands for the rise time until coming into operation of the floppy disc drive 32.

If an impact exceeding e.g., 8G is produced at time t2, this impact is sequentially transmitted from the casing 2 via chassis 42, circuit substrate 41 and the acceleration sensor 33, which then outputs an impact detection signal. This detection signal from the acceleration sensor 33 is amplified by the amplification circuit 34 and thence supplied to the flip-flop 35 to invert the output thereof. The inverted output signal of the flip-flop 35 is sent to the micro-computer 28 and to the AND gate 36. This complements the output signal of the AND gate 36 to close the gate of the control signals from the FDC 31 for the floppy disc drive 32. Thus, the control current ceases to be supplied as from time t2 to the recording head 74 of the floppy disc drive 32, as shown in FIG. 22.

Since the chassis 42 and the floppy disc drive 32 are interconnected via buffer members 45 to 48 adapted for delaying the impact transmission, this impact is transmitted at a timing delayed from the transmission timing to the acceleration sensor 33, herein a pre-set timing delayed from time t2. Since no recording current is supplied at this timing to the magnetic head 74 of the floppy disc drive 32, it becomes possible to prevent erosion to neighboring tracks or failure in writing in the current track even on occurrence of detracking of the magnetic head 74 by impacts.

That is, in the present embodiment, since the time when the impact applied to the casing 2 is transmitted to the floppy disc drive 32 can be retarded, the impact applied to the acceleration sensor 33 can be relatively quickened thus compensating for the time delay required for interrupting the recording current. In particular, if the casing 2 or the chassis 42 is of high tenacity, the speed at which the impact is transmitted to the magnetic head 74 of the floppy disc drive 32 is increased significantly, such that the recording current interruption after detection of the acceleration sensor 33 cannot be achieved in time. In such case, it is highly effective to interconnect the floppy disc drive 32 and the casing 2 with interposition of the buffer members 45 to 48, as shown in FIGS. 16 and 18, because the impact transmission timing can then be retarded to permit the function of the acceleration sensor 33 to be performed more effectively.

It has been confirmed experimentally that, in the present embodiment, the time until the impact applied to the casing 2 is transmitted to the floppy disc drive 32 is 11 msec±5 sec.

If an output signal of the flip-flip 35, complemented on occurrence of the impact, is fed to the micro-computer 28 at time t2, the micro-computer 28 outputs a control signal to the FDC 31 to move the magnetic head 74 to an original track of the track n by way of re-seeking control.

At a time t3 when the re-seeking comes to a close, a reset signal is outputted to the flip-flop 35. The output signal of the flip-flop 35 is complemented at time t4 corresponding to the decay time of the reset signal, this complemented signal being sent to the micro-computer 28 and to the AND gate 36. By the complemented output signal being sent to the AND gate 36, the output signal of the AND gate 36 is complemented at this time t4 to open the gate to permit data recording by the floppy disc drive 32.

The micro-computer 28 then controls the FDC 31 to supply the recording data from the FDC 31 to the floppy disc drive 32, with the recording data as from the recording start time t1 as the re-trial data. This furnishes the recording current for the re-trial data to the recording head 74 of the floppy disc drive 32 as from time t5, as shown in FIG. 22, thus causing the recording data to be written as from the pre-set sector of the track n. Meanwhile, the time interval since time t4 until time t5 is the rise time until actuation of the floppy disc drive 32.

Figure 23:
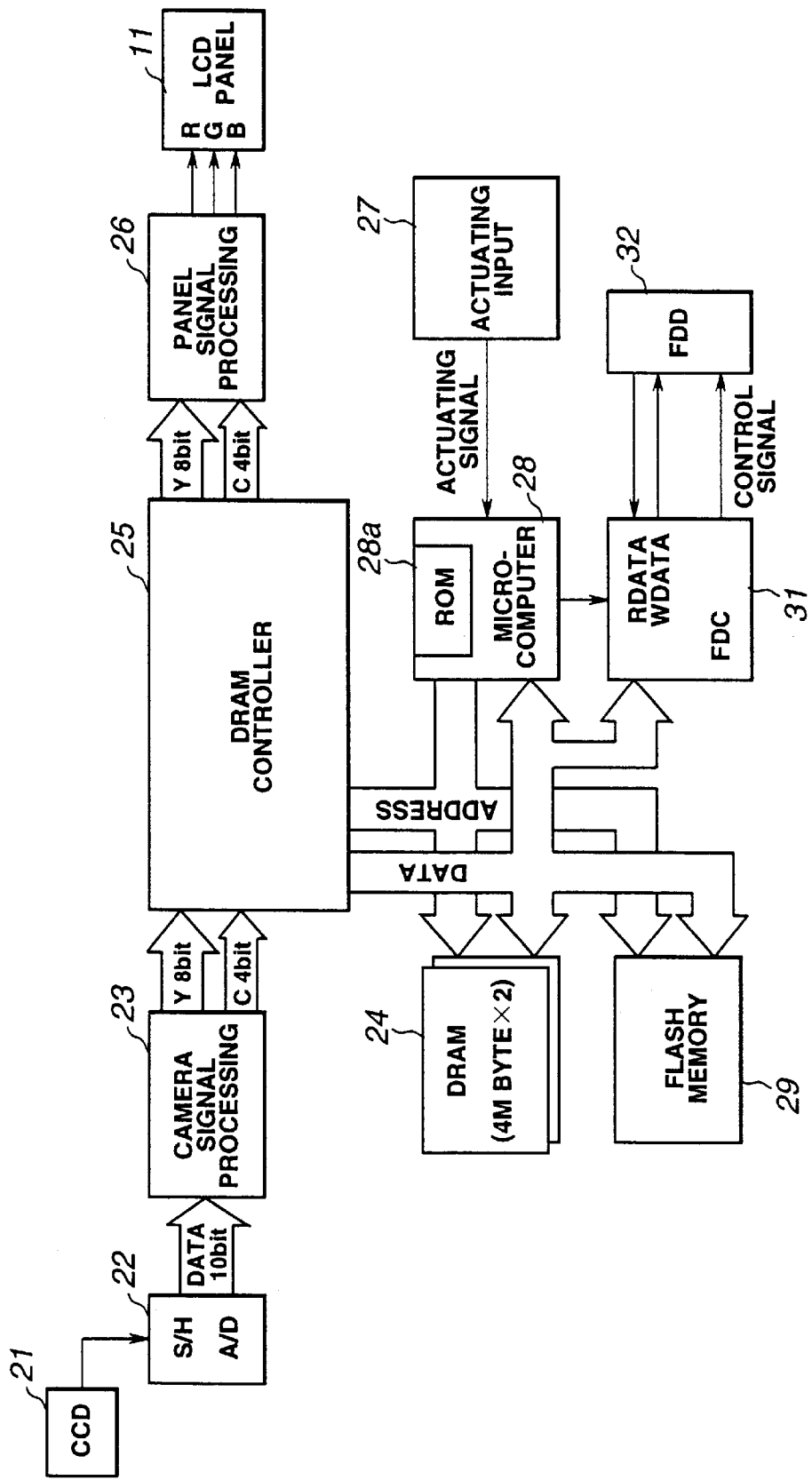
FIG. 23 is a block circuit diagram for illustrating a modification of the digital camera device.

The digital camera device 1 may be provided with a flash memory 29, as shown in FIG. 23. In the embodiment of FIG. 23, the DRAM 24, DRAM controller 25, micro-computer 28, flash memory 29 and the FDC 31 are interconnected over a common bus. With this configuration of the digital camera device 1, it is possible to store a version-up program in the flash memory 29 for version-up of the function of the digital camera device 1. Specifically, the floppy disc cartridge 8 having recorded therein a version-up program for compressing picture data by a system other than the JPEG system can be loaded on the floppy disc drive 32 in order to get the program read from the magnetic disc 9 into the flash memory to achieve function expansion.

That is, since each block in the digital camera device 1 is controlled by the software program loaded in the RAM 28a of the micro-computer 28, a variety of version-up software programs can be stored in this flash memory 29 so as to operate in place of or assist the micro-computer 28.

What is claimed is:

1. A camera apparatus for converting images to digital picture data, compressing the digital picture data and recording the compressed digital picture data in a first area of a disc-shaped recording medium, the camera apparatus comprising:

means for recording the compressed digital picture data with a first identification code;

means for generating index picture data associated with the digital picture data;

means for recording the index picture data with a second identification code in a second area of the disc-shaped recording medium, the second area being independent from the first area in which the compressed digital picture data is recorded, said first and second identification codes having at least a portion that is similar to permit association of an index picture data with an associated compressed digital picture data;

means for extracting the second identification codes of the index picture data from the disc-shaped recording medium;

means for associating a digital picture file with a corresponding index file based on the similar portion of the first and second identification codes; and means for generating a table associating the digital picture files with-a physical location of an associated index file based on the association of similar portions of the first and second identification codes.

2. The camera apparatus according to claim 1, wherein the first and second identification codes are based on filenames of the digital picture file and the associated index file.

3. The camera apparatus of claim 1, further comprising:

means for reading out the index picture data from the disc-shaped recording medium.

4. The camera apparatus of claim 3, further comprising:

means for displaying the index picture data and a content included in the associated digital picture file according to a signal indicating selection of the index picture data.

5. The camera apparatus of claim 1, wherein the first area includes an outer rim of the disc-shaped recording medium and the second area includes an inner rim of the disc-shaped recording medium.

6. The camera apparatus according to claim 1, further comprising means for associating the digital picture files with a physical location of an associated index file based on the similar portions of the first and second identification codes.

7. The camera apparatus according to claim 1, wherein the index files comprise thumbnail files.

8. A method of writing picture data onto a disc-shaped recording medium, comprising:

converting an electrical signal from an imaging device to digital picture data;

compressing the digital picture data;

converting the compressed digital picture data to a designated format;

generating index picture data associated with the digital picture data;

recording the digital picture data in a first area of the disc-shaped recording medium with a first filename;

recording the index picture data with a second filename having a portion which is similar to a portion of the first filename in a second area of the disc-shaped recording medium independent from the first area in which the digital picture data is recorded;

extracting the second filenames of the index picture data from the disc-shaped recording medium;

associating a digital picture file with a corresponding index file based on the similar portions of the first and second filenames; and generating a table for associating the digital picture files with a physical location of an associated index file based on the associating step.

9. The method according to claim 8, wherein the compressing step compresses the digital picture data in accordance with a Joint Photographic Coding Experts Group (JPEG) format.

10. The method according to claim 8, wherein the designated format includes an MS-DOS format.

11. The method according to claim 8, wherein the disc-shaped recording medium is a floppy disk.

12. The method according to claim 8, wherein the first area includes an outer rim of the disc-shaped recording medium and the second area includes an inner rim of the disc-shaped recording medium.

13. The method of claim 8, wherein the index files comprise thumbnail files.

14. A method for reading picture data recorded on a disc-shaped recording medium, comprising:

providing the picture data with first identification codes and corresponding index picture data with second identification codes having portions that are similar to portions of the first identification codes;

extracting the second identification codes of the index picture data from the disc-shaped recording medium;

associating a digital picture file with a corresponding index file based on the similar portion of the first and second identification codes;

reading out the index picture data from the disc-shaped recording medium corresponding to one or more digital picture files desired to be viewed; and generating a table for associating the digital picture files with a physical location of an associated index file based on the associating step.

15. The method according to claim 14, further comprising displaying the index picture data on a display device provided.

16. The method of claim 14, wherein the index files comprise thumbnail files.

17. A camera, comprising:

a housing for holding a removable recording medium which stores in a first area digital picture data and in a second area index picture data, wherein the first area and the second area are independent; and a processor for (a) recording the digital picture data in the first area of the recording medium with a first identification code, (b) recording the index picture data with a second identification code in the second area of the recording medium, the second identification code having a portion that is similar to a portion of the first identification code, (c) associating a digital picture file with a, corresponding index file based on the similar portion of the first and second identification codes and (d) generating a table for associating the digital picture files with a physical location of said associated index file.

18. The camera of claim 17, wherein the removable recording medium is disc-shaped and wherein the first area includes an outer rim of the disc-shaped recording medium and the second area includes an inner rim of the disc-shaped recording medium.

19. The camera of claim 17, wherein the processor creates a table in a memory for associating an address in the first area of the removable recording medium in which the compressed digital picture is stored with an address in the second area in which the thumbnail image is stored.

20. The camera of claim 17, further comprising a liquid crystal display panel for displaying the thumbnail image.

21. The camera according to claim 17, wherein the index files comprise thumbnail files.

22. A method of writing picture data onto a disc-shaped recording medium, comprising:

converting an electrical signal from an imaging device to digital picture data;

compressing the digital picture data;

converting the compressed digital picture data to a designated format;

generating index picture data associated with the digital picture data;

recording the digital picture data in a first area of the disc-shaped recording medium with a first identification code;

recording the index picture data with a second identification code having a portion which is similar to a portion of the first identification code in a second area of the disc-shaped recording medium independent from the first area in which the digital picture data is recorded;

extracting the second identification codes of the index picture data from the disc-shaped recording medium;

associating a digital picture file with a corresponding index file based on the similar portion of the first and second identification codes; and generating a table for associating the digital picture files with a physical location of an associated index file based on the associating step.

23. The method of claim 22, wherein the index files comprise thumbnail files.

24. The method of claim 22, wherein the first and second identification codes are based on filenames of the digital picture file and the associated index file.

25. A method of associating index picture data with compressed picture data stored by a digital camera having a disc-shaped recording medium, comprising:

converting an electrical signal from a digital camera to digital picture data;

compressing the digital picture data;

generating index picture data associated with the digital picture data;

recording the digital picture data in a first area of the disc-shaped recording medium with a first identification code;

recording the index picture data with a second identification code in a second area of the disc-shaped recording medium independent from the first area in which the digital picture data is recorded, the second identification code having a portion that is similar to a portion of the first identification code;

extracting the second identification codes of the index picture data from the disc-shaped recording medium;

extracting the index picture data from the disc-shaped recording media to a memory in the digital camera in the physical order of storage of the index picture data on the disc-shaped recording media;

associating a digital picture file with a corresponding index file based on the similar portion of the first and second identification codes; and generating a table for associating the digital picture files with a physical location of an associated index file based on the associating step.

26. The method of claim 25, wherein the index files comprise thumbnail files.

27. The method of claim 25, wherein the memory comprises a RAM memory.

28. The method of claim 25, wherein the table associates a memory location of the index file with the associated digital picture file.

29. The method of claim 25, wherein the first and second identification codes are based on filenames of the digital picture file and the associated index file.

* * * * *

UNITED STATES PATENT AND TRADEMARK OFFICE
CERTIFICATE OF CORRECTION

PATENT NO. : 6,738,092 B1
DATED : May 18, 2004
INVENTOR(S) : Yutaka Nakagawa

It is certified that error appears in the above-identified patent and that said Letters Patent is hereby corrected as shown below:

Column 2,
Line 42, "o" should read -- so --.

Column 3,
Line 30, "[JPG]" (second occurrence) should read -- [.411] --.

Column 4,
Line 51, delete "3."

Column 6,
Line 47, "511" should read -- S11 --.

Column 8,
Line 21, delete the word "as".

Column 16,
Line 39, "with-a" should read -- with a --.

Column 18,
Line 1, "a," should read -- a --.

Signed and Sealed this

Tenth Day of August, 2004

JON W. DUDAS
*Acting Director of the United States Patent and Trademark Office*